(12) United States Patent
Volk et al.

(10) Patent No.: US 11,801,521 B2
(45) Date of Patent: Oct. 31, 2023

(54) MAIN BODY FOR A SPRAY GUN, SPRAY GUNS, SPRAY GUN SET, METHOD FOR PRODUCING A MAIN BODY FOR A SPRAY GUN AND METHOD FOR CONVERTING A SPRAY GUN

(71) Applicant: SATA GmbH & Co. KG, Kornwestheim (DE)

(72) Inventors: Eva Volk, Ludwigsburg (DE); Dietrich Wolter, Bietigheim-Bissingen (DE)

(73) Assignee: SATA GmbH & Co. KG, Kornwestheim (DE)

(*) Notice: Subject to any disclaimer, the term of this patent is extended or adjusted under 35 U.S.C. 154(b) by 0 days.

(21) Appl. No.: 16/524,740

(22) Filed: Jul. 29, 2019

(65) Prior Publication Data

US 2020/0038892 A1 Feb. 6, 2020

(30) Foreign Application Priority Data

Aug. 1, 2018 (DE) .................. 10 2018 118 738.6

(51) Int. Cl.
*B05B 7/02* (2006.01)
*B05B 15/65* (2018.01)
(Continued)

(52) U.S. Cl.
CPC .............. *B05B 7/02* (2013.01); *B05B 7/2408* (2013.01); *B05B 9/01* (2013.01); *B05B 15/65* (2018.02); *B05B 7/2478* (2013.01); *B33Y 80/00* (2014.12)

(58) Field of Classification Search
CPC ....... B05B 1/34; B05B 11/06; B05B 11/0005; B05B 7/08; B05B 7/2478; B05B 7/068;
(Continued)

(56) References Cited

U.S. PATENT DOCUMENTS 40,433 A 10/1863 Sees
327,260 A 9/1885 Hart
(Continued)

FOREIGN PATENT DOCUMENTS

AT 153883 6/1997
AT 163577 3/1998
(Continued)

OTHER PUBLICATIONS

Response to Final Office Action and Request for Continued Examination Pursuant to 37 C.F.R. §1.114, for U.S. Appl. No. 15/679,533, filed Jan. 4, 2021.

(Continued)

*Primary Examiner* — Chee-Chong Lee
(74) *Attorney, Agent, or Firm* — Paul D. Bianco; Fleit Intellectual Property Law

(57) ABSTRACT

A main body for a spray gun, in particular a paint spray gun, has at least one head region for attachment of a nozzle arrangement. The head region has at least one inner wall, one outer wall and one middle wall arranged therebetween. The walls are formed in encircling fashion and in one piece with the main body, with the front end of the middle wall set back in relation to the front end of the outer wall along an axis. This main body does not require any additional sealing element for sealing between the atomization air region and horn air region. The middle wall is well protected against damage even when a nozzle has been unscrewed, and the gun head can be of very compact design.

29 Claims, 9 Drawing Sheets

US 11,801,521 B2

Page 2

(51) Int. Cl.
*B05B 7/24* (2006.01)
*B05B 9/01* (2006.01)
*B33Y 80/00* (2015.01)

(58) Field of Classification Search
CPC ......... B05B 7/0815; B05B 7/066; B05B 7/02;
B05B 15/65; B05B 7/2408
USPC ................................................ 239/290, 526
See application file for complete search history.

(56) References Cited

U.S. PATENT DOCUMENTS

| | | |
|---|---|---|
| 459,432 A | 9/1891 | Anderson |
| 459,433 A | 9/1891 | Avery |
| 548,816 A | 10/1895 | Paul |
| 552,213 A | 12/1895 | Troy |
| 552,715 A | 1/1896 | Lugrin |
| 563,505 A | 7/1896 | McCornack |
| 581,107 A | 4/1897 | Emery |
| 644,803 A | 3/1900 | Justi |
| 672,012 A | 4/1901 | Ruper |
| 574,880 A | 5/1901 | Schmidt et al. |
| 1,662,496 A | 3/1928 | Forsgard |
| 1,703,383 A | 2/1929 | Birkenmaier |
| 1,703,384 A | 2/1929 | Birkenmaier |
| 1,711,221 A | 4/1929 | Blakeslee |
| 1,751,787 A | 3/1930 | Binks |
| 1,889,201 A | 11/1932 | Holveck |
| 2,004,303 A | 6/1935 | Wahlin |
| 2,008,381 A | 7/1935 | Beeg |
| 2,049,700 A | 8/1936 | Gustafsson |
| 2,051,210 A | 8/1936 | Gustafsson |
| 2,070,696 A | 2/1937 | Tracy |
| 2,116,036 A | 5/1938 | Money |
| 2,125,445 A | 8/1938 | Holveck |
| 2,198,441 A | 4/1940 | Mollart |
| 2,204,599 A | 6/1940 | Jenkins |
| 2,269,057 A | 1/1942 | Jenkins |
| D133,223 S | 7/1942 | Tammen |
| 2,356,865 A | 8/1944 | Mason |
| 2,416,856 A | 3/1947 | Thomsen |
| 2,416,923 A | 3/1947 | Jenkins |
| 2,470,718 A * | 5/1949 | Peeps .................... B05B 7/0815 239/300 |
| 2,557,593 A | 6/1951 | Bjorkman |
| 2,557,606 A | 6/1951 | Liedberg |
| 2,559,091 A | 7/1951 | Reasenberg |
| 2,609,961 A | 9/1952 | Sapien |
| 2,612,899 A | 10/1952 | Earle |
| 2,646,314 A | 7/1953 | Peeps |
| 2,721,004 A | 10/1955 | Schultz |
| 2,743,963 A | 5/1956 | Peeps |
| 2,844,267 A | 7/1958 | Petriccione |
| 2,886,252 A | 5/1959 | Ehrensperger |
| 3,090,530 A | 5/1963 | Peeps |
| D196,477 S | 10/1963 | Kelly |
| 3,159,472 A | 12/1964 | Revell |
| D200,594 S | 3/1965 | Sass |
| 3,240,398 A | 3/1966 | Dalton, Jr. |
| D204,306 S | 4/1966 | Hamm |
| D205,760 S | 9/1966 | Hocutt et al. |
| D208,903 S | 10/1967 | Zadron et al. |
| 3,344,992 A | 10/1967 | Norris |
| 3,381,845 A | 5/1968 | MacDonald |
| 3,417,650 A | 12/1968 | Varrin |
| 3,420,106 A | 1/1969 | Keller et al. |
| 3,435,683 A | 4/1969 | Keller et al. |
| 3,482,781 A | 12/1969 | Sharpe |
| D217,928 S | 6/1970 | Felske |
| 3,524,589 A | 8/1970 | Pelton, Jr. |
| 3,527,372 A | 9/1970 | Manning |
| 3,583,632 A | 6/1971 | Schaffer |
| 3,622,078 A | 11/1971 | Gronert |
| 3,645,562 A | 2/1972 | Fandetti et al. |
| 3,656,493 A | 4/1972 | Black et al. |
| 3,714,967 A | 2/1973 | Zupan et al. |
| 3,746,253 A | 7/1973 | Walberg |
| 3,747,850 A | 7/1973 | Hastings et al. |
| 3,771,539 A | 11/1973 | De Santis |
| 3,840,143 A | 10/1974 | Davis et al. |
| 3,848,807 A | 11/1974 | Partida |
| 3,857,511 A | 12/1974 | Govindan |
| 3,870,223 A | 3/1975 | Wyant |
| 3,873,023 A | 3/1975 | Moss et al. |
| 3,938,739 A | 2/1976 | Bertilsson et al. |
| 4,000,915 A | 1/1977 | Strom |
| D245,048 S | 7/1977 | Pool |
| D252,097 S | 6/1979 | Probst et al. |
| 4,160,525 A | 7/1979 | Wagner |
| 4,171,091 A | 10/1979 | van Hardeveld et al. |
| 4,210,263 A | 7/1980 | Bos |
| 4,273,293 A | 6/1981 | Hastings |
| 4,278,276 A | 7/1981 | Ekman |
| 4,411,387 A | 10/1983 | Stern et al. |
| 4,478,370 A | 10/1984 | Hastings |
| D276,472 S | 11/1984 | Harrison |
| D278,543 S | 4/1985 | Gintz |
| 4,545,536 A | 10/1985 | Avidon |
| 4,562,965 A | 1/1986 | Ihmels et al. |
| 4,572,437 A | 2/1986 | Huber et al. |
| 4,580,035 A | 4/1986 | Luscher |
| 4,585,168 A | 4/1986 | Even et al. |
| 4,614,300 A | 9/1986 | Falcoff |
| 4,643,330 A | 2/1987 | Kennedy |
| 4,653,661 A | 3/1987 | Buchner et al. |
| 4,667,878 A | 5/1987 | Behr |
| 4,713,257 A | 12/1987 | Luttermoeller |
| D293,950 S | 1/1988 | Ogden et al. |
| 4,730,753 A | 3/1988 | Grime |
| 4,767,057 A | 8/1988 | Degli |
| D298,372 S | 11/1988 | Taylor, Jr. |
| 4,784,184 A | 11/1988 | Gates |
| 4,806,736 A | 2/1989 | Schirico |
| 4,826,539 A | 5/1989 | Harpold |
| 4,832,232 A | 5/1989 | Broccoli |
| 4,844,347 A | 7/1989 | Konhauser |
| 4,854,504 A | 8/1989 | Hedger, Jr. et al. |
| 4,863,781 A | 9/1989 | Kronzer |
| 4,877,144 A | 10/1989 | Thanisch |
| D305,057 S | 12/1989 | Morgan |
| 4,887,747 A | 12/1989 | Ostrowsky et al. |
| 4,901,761 A | 2/1990 | Taylor |
| 4,906,151 A | 3/1990 | Kubis |
| 4,917,300 A | 4/1990 | Gloviak et al. |
| 4,946,075 A | 8/1990 | Lundback |
| 4,964,361 A | 10/1990 | Aebersold |
| 4,967,600 A | 11/1990 | Keller |
| 4,969,603 A | 11/1990 | Norman |
| 4,973,184 A | 11/1990 | La Salle |
| D314,421 S | 2/1991 | Tajima et al. |
| D314,588 S | 2/1991 | Denham |
| 4,989,787 A | 2/1991 | Nikkei et al. |
| 5,020,700 A | 6/1991 | Krzywdziak et al. |
| D318,877 S | 8/1991 | Miranda et al. |
| 5,042,840 A | 8/1991 | Rieple et al. |
| D321,597 S | 11/1991 | Cerny |
| 5,064,119 A | 11/1991 | Mellette |
| 5,071,074 A | 12/1991 | Lind |
| 5,074,334 A | 12/1991 | Onodera |
| 5,078,323 A | 1/1992 | Frank |
| 5,080,285 A | 1/1992 | Toth |
| 5,088,648 A | 2/1992 | Schmon |
| 5,090,623 A | 2/1992 | Burns et al. |
| 5,102,045 A | 4/1992 | Diana |
| 5,119,992 A | 6/1992 | Grime |
| 5,125,391 A | 6/1992 | Srivastava et al. |
| 5,135,124 A | 8/1992 | Wobser |
| 5,143,102 A | 9/1992 | Blaul |
| 5,165,605 A | 11/1992 | Morita |
| 5,170,941 A | 12/1992 | Morita et al. |
| 5,190,219 A | 3/1993 | Copp, Jr. |
| 5,191,797 A | 3/1993 | Smith |
| 5,209,405 A | 5/1993 | Robinson |
| 5,228,488 A | 7/1993 | Fletcher |

(56) References Cited

U.S. PATENT DOCUMENTS

| | | |
|---|---|---|
| 5,232,299 A | 8/1993 | Hiss |
| 5,236,128 A | 8/1993 | Morita et al. |
| 5,249,746 A | 10/1993 | Kaneko et al. |
| D341,186 S | 11/1993 | Albers |
| 5,289,974 A | 3/1994 | Grime et al. |
| 5,322,221 A | 6/1994 | Anderson |
| 5,325,473 A | 6/1994 | Monroe et al. |
| 5,332,156 A | 7/1994 | Wheeler |
| 5,333,506 A | 8/1994 | Smith et al. |
| 5,333,908 A | 8/1994 | Dorney et al. |
| 5,344,078 A | 9/1994 | Fritz et al. |
| 5,367,148 A | 11/1994 | Storch et al. |
| D353,836 S | 12/1994 | Carvelli et al. |
| 5,381,962 A | 1/1995 | Teague |
| 5,435,491 A | 7/1995 | Sakuma |
| 5,443,642 A | 8/1995 | Bienduga |
| 5,456,414 A | 10/1995 | Burns |
| D365,952 S | 1/1996 | Gagnon et al. |
| 5,503,439 A | 4/1996 | LaJeunesse et al. |
| 5,529,245 A | 6/1996 | Brown |
| 5,533,674 A | 7/1996 | Feyrer et al. |
| 5,540,385 A | 7/1996 | Garlick |
| 5,540,386 A | 7/1996 | Roman |
| D376,637 S | 12/1996 | Kieffer |
| 5,582,350 A | 12/1996 | Kosmyna et al. |
| 5,584,899 A | 12/1996 | Shorts |
| 5,588,562 A | 12/1996 | Sander et al. |
| 5,592,597 A | 1/1997 | Kiss |
| 5,609,302 A | 3/1997 | Smith |
| 5,613,637 A | 3/1997 | Schmon |
| D380,301 S | 7/1997 | Kogutt |
| 5,655,714 A | 8/1997 | Kieffer et al. |
| 5,662,444 A | 9/1997 | Schmidt, Jr. |
| 5,667,143 A | 9/1997 | Sebion et al. |
| 5,695,125 A | 12/1997 | Kumar |
| 5,704,381 A | 1/1998 | Millan et al. |
| 5,718,767 A | 2/1998 | Crum et al. |
| D391,403 S | 3/1998 | Josephs |
| 5,725,161 A | 3/1998 | Hartle |
| RE35,769 E | 4/1998 | Grime et al. |
| 5,755,363 A | 5/1998 | Gantner et al. |
| 5,762,228 A | 6/1998 | Morgan et al. |
| 5,803,360 A | 9/1998 | Spitznagel |
| 5,816,501 A | 10/1998 | LoPresti et al. |
| 5,829,682 A | 11/1998 | Haruch |
| 5,836,517 A | 11/1998 | Burns et al. |
| D402,820 S | 12/1998 | Morison et al. |
| 5,843,515 A | 12/1998 | Crum et al. |
| 5,853,014 A | 12/1998 | Rosenauer |
| D405,503 S | 2/1999 | Edo |
| 5,874,680 A | 2/1999 | Moore |
| 5,884,006 A | 3/1999 | Frohlich et al. |
| D409,719 S | 5/1999 | Kaneko |
| 5,941,461 A | 8/1999 | Akin et al. |
| 5,951,190 A | 9/1999 | Wilson |
| 5,951,296 A | 9/1999 | Klein |
| 5,954,268 A | 9/1999 | Joshi et al. |
| D414,636 S | 10/1999 | Wiese |
| 5,979,797 A | 11/1999 | Castellano |
| 5,992,763 A | 11/1999 | Smith et al. |
| 6,006,930 A | 12/1999 | Dreyer et al. |
| 6,010,082 A | 1/2000 | Peterson |
| 6,017,394 A | 1/2000 | Crum et al. |
| 6,019,294 A | 2/2000 | Anderson |
| 6,036,109 A | 3/2000 | DeYoung |
| 6,039,218 A | 3/2000 | Beck |
| 6,050,499 A | 4/2000 | Takayama |
| 6,053,429 A | 4/2000 | Chang |
| 6,056,213 A | 5/2000 | Ruta et al. |
| 6,056,215 A | 5/2000 | Hansinger |
| 6,089,471 A | 7/2000 | Scholl |
| 6,089,607 A | 7/2000 | Keeney et al. |
| 6,091,053 A | 7/2000 | Aonuma |
| 6,092,740 A | 7/2000 | Liu |
| 6,132,511 A | 10/2000 | Crum et al. |
| D435,379 S | 12/2000 | Nguyen |
| 6,230,986 B1 | 5/2001 | Vacher et al. |
| 6,250,567 B1 | 6/2001 | Lewis et al. |
| 6,267,301 B1 | 7/2001 | Haruch |
| 6,276,616 B1 | 8/2001 | Jenkins |
| D448,451 S | 9/2001 | Turnbull et al. |
| 6,308,991 B1 | 10/2001 | Royer |
| D457,599 S | 5/2002 | Karwoski et al. |
| D459,432 S | 6/2002 | Schmon |
| D459,433 S | 6/2002 | Schmon |
| 6,402,058 B2 | 6/2002 | Kaneko et al. |
| 6,402,062 B1 | 6/2002 | Bending et al. |
| 6,431,466 B1 | 8/2002 | Kitajima |
| 6,435,426 B1 | 8/2002 | Copp, Jr. |
| 6,442,276 B1 | 8/2002 | Doljack |
| 6,450,422 B1 | 9/2002 | Maggio |
| 6,494,387 B1 | 12/2002 | Kaneko |
| 6,536,684 B1 | 3/2003 | Wei |
| 6,536,687 B1 | 3/2003 | Navis et al. |
| D472,730 S | 4/2003 | Sparkowski |
| 6,540,114 B1 | 4/2003 | Popovich et al. |
| 6,543,632 B1 | 4/2003 | McIntyre et al. |
| 6,547,160 B1 | 4/2003 | Huang |
| 6,547,884 B1 | 4/2003 | Crum et al. |
| 6,553,712 B1 | 4/2003 | Majerowski et al. |
| 6,554,009 B1 | 4/2003 | Beijbom et al. |
| D474,528 S | 5/2003 | Huang |
| 6,585,173 B2 | 7/2003 | Schmon et al. |
| 6,595,441 B2 | 7/2003 | Petrie et al. |
| 6,612,506 B1 | 9/2003 | Huang |
| 6,626,382 B1 | 9/2003 | Liu |
| 6,626,383 B1 | 9/2003 | Campbell |
| 6,647,997 B2 | 11/2003 | Mohn |
| 6,661,438 B1 | 12/2003 | Shiraishi et al. |
| D485,685 S | 1/2004 | Zupkofska et al. |
| 6,675,845 B2 | 1/2004 | Volpenheim et al. |
| 6,692,118 B2 | 2/2004 | Michele et al. |
| 6,712,292 B1 | 3/2004 | Gosis et al. |
| 6,717,584 B2 | 4/2004 | Kulczycka |
| 6,732,751 B2 | 5/2004 | Chiang |
| 6,763,964 B1 | 7/2004 | Hurlbut et al. |
| 6,766,763 B2 | 7/2004 | Crum et al. |
| 6,786,345 B2 | 9/2004 | Richards |
| 6,796,514 B1 | 9/2004 | Schwartz |
| 6,801,211 B2 | 10/2004 | Forsline et al. |
| 6,820,824 B1 | 11/2004 | Joseph et al. |
| 6,843,390 B1 | 1/2005 | Bristor |
| 6,845,924 B2 | 1/2005 | Schmon |
| 6,855,173 B2 | 2/2005 | Ehrnsperger et al. |
| 6,863,310 B1 | 3/2005 | Petkovsek |
| 6,863,920 B2 | 3/2005 | Crum et al. |
| 6,874,656 B2 | 4/2005 | Rohr et al. |
| 6,874,664 B1 | 4/2005 | Montgomery |
| 6,874,708 B2 | 4/2005 | Reetz, III |
| 6,877,677 B2 | 4/2005 | Schmon et al. |
| 6,929,019 B2 | 8/2005 | Weinmann et al. |
| 6,945,429 B2 | 9/2005 | Gosis et al. |
| 6,955,180 B2 | 10/2005 | Kocherlakota et al. |
| 6,962,432 B2 | 11/2005 | Hofeldt |
| 6,963,331 B1 | 11/2005 | Kobayashi et al. |
| 7,017,838 B2 | 3/2006 | Schmon |
| 7,018,154 B2 | 3/2006 | Schmon |
| D519,687 S | 4/2006 | Zahav |
| 7,032,839 B2 | 4/2006 | Blette et al. |
| 7,036,752 B1 | 5/2006 | Hsiang |
| 7,083,119 B2 | 8/2006 | Bouic et al. |
| 7,090,148 B2 | 8/2006 | Petrie et al. |
| 7,097,118 B1 | 8/2006 | Huang |
| D528,192 S | 9/2006 | Nicholson |
| 7,106,343 B1 | 9/2006 | Hickman |
| 7,165,732 B2 | 1/2007 | Kosmyna et al. |
| 7,172,139 B2 | 2/2007 | Bouic et al. |
| 7,175,110 B2 | 2/2007 | Vicentini |
| 7,182,213 B2 | 2/2007 | King |
| D538,050 S | 3/2007 | Tardif |
| D538,493 S | 3/2007 | Zimmerle et al. |
| D538,886 S | 3/2007 | Huang |
| 7,194,829 B2 | 3/2007 | Boire et al. |
| D541,053 S | 4/2007 | Sanders |

(56) References Cited

U.S. PATENT DOCUMENTS

| | | |
|---|---|---|
| D541,088 S | 4/2007 | Nesci |
| 7,201,336 B2 | 4/2007 | Blette et al. |
| 7,216,813 B2 | 5/2007 | Rogers |
| D545,943 S | 7/2007 | Rodgers et al. |
| 7,246,713 B2 | 7/2007 | King |
| 7,249,519 B2 | 7/2007 | Rogers |
| D548,816 S | 8/2007 | Schmon |
| 7,255,293 B2 | 8/2007 | Dodd |
| 7,264,131 B2 | 9/2007 | Tsutsumi et al. |
| D552,213 S | 10/2007 | Schmon |
| D552,715 S | 10/2007 | Schmon |
| D554,703 S | 11/2007 | Josephson |
| 7,328,855 B2 | 2/2008 | Chatron et al. |
| D563,505 S | 3/2008 | Schmon |
| 7,374,111 B2 | 5/2008 | Joseph et al. |
| D571,463 S | 6/2008 | Chesnin |
| 7,384,004 B2 | 6/2008 | Rogers |
| RE40,433 E | 7/2008 | Schmon |
| D573,227 S | 7/2008 | Mirazita et al. |
| D574,926 S | 8/2008 | Huang |
| D575,374 S | 8/2008 | Huang |
| 7,410,106 B2 | 8/2008 | Escoto, Jr. et al. |
| 7,416,140 B2 | 8/2008 | Camilleri et al. |
| 7,422,164 B2 | 9/2008 | Matsumoto |
| D579,213 S | 10/2008 | Aipa |
| D581,107 S | 11/2008 | Schmon |
| D581,483 S | 11/2008 | Bass et al. |
| D583,013 S | 12/2008 | Wang |
| 7,458,612 B1 | 12/2008 | Bennett |
| 7,472,840 B2 | 1/2009 | Gregory |
| D588,231 S | 3/2009 | Pellin |
| 7,533,678 B2 | 5/2009 | Rosa |
| 7,540,434 B2 | 6/2009 | Gohring et al. |
| 7,542,032 B2 | 6/2009 | Kruse |
| 7,568,638 B2 | 8/2009 | Gehrung |
| D604,394 S | 11/2009 | Wang |
| 7,614,571 B2 | 11/2009 | Camilleri et al. |
| D607,086 S | 12/2009 | Kosaka |
| 7,624,869 B2 | 12/2009 | Primer |
| D607,972 S | 1/2010 | Wang |
| D608,858 S | 1/2010 | Baltz et al. |
| D614,731 S | 4/2010 | Wang |
| 7,694,893 B2 | 4/2010 | Zittel et al. |
| 7,694,896 B2 | 4/2010 | Turnbull et al. |
| D615,586 S | 5/2010 | Kudimi |
| D616,022 S | 5/2010 | Kudimi |
| D616,527 S | 5/2010 | Anderson et al. |
| 7,765,876 B1 | 8/2010 | Chen |
| D624,668 S | 9/2010 | Noppe |
| 7,810,744 B2 | 10/2010 | Schmon et al. |
| 7,819,341 B2 | 10/2010 | Schmon et al. |
| D627,039 S | 11/2010 | Yu |
| D627,432 S | 11/2010 | Escoto et al. |
| 7,823,806 B2 | 11/2010 | Schmon |
| D629,623 S | 12/2010 | Lampe |
| 7,856,940 B2 | 12/2010 | Wendler |
| 7,913,938 B2 | 3/2011 | Cooper |
| 7,922,107 B2 | 4/2011 | Fox |
| D637,269 S | 5/2011 | Wang |
| D638,121 S | 5/2011 | Villasana |
| D639,863 S | 6/2011 | Langan |
| D641,067 S | 7/2011 | Wang |
| D644,716 S | 9/2011 | Gehrung |
| D644,803 S | 9/2011 | Schmon |
| D645,094 S | 9/2011 | Langan |
| 8,042,402 B2 | 10/2011 | Brown et al. |
| D649,196 S | 11/2011 | Langan |
| 8,052,071 B2 | 11/2011 | Kruse |
| D655,347 S | 3/2012 | Gehrung |
| 8,127,963 B2 | 3/2012 | Gerson et al. |
| D657,276 S | 4/2012 | Brose |
| D661,492 S | 6/2012 | Ranschau |
| D661,742 S | 6/2012 | Clark |
| D663,960 S | 7/2012 | Jeronimo |
| 8,225,892 B2 | 7/2012 | Ben-Tzvi |
| D664,773 S | 8/2012 | Papin |
| 8,240,579 B1 | 8/2012 | Bennett |
| 8,297,536 B2 | 10/2012 | Ruda |
| D670,085 S | 11/2012 | Brookman et al. |
| D671,988 S | 12/2012 | Leipold |
| D672,012 S | 12/2012 | Brose et al. |
| D674,880 S | 1/2013 | Schmon |
| 8,352,744 B2 | 1/2013 | Kruse |
| 8,360,345 B2 | 1/2013 | Micheli |
| D681,162 S | 4/2013 | Kruse |
| 8,444,067 B2 | 5/2013 | Schmon et al. |
| 8,454,759 B2 | 6/2013 | Selsvik |
| 8,481,124 B2 | 7/2013 | Nolte et al. |
| D689,590 S | 9/2013 | Brose |
| D689,593 S | 9/2013 | Schmon |
| D690,799 S | 10/2013 | Maier |
| D692,530 S | 10/2013 | Gehrung |
| D692,532 S | 10/2013 | Li et al. |
| 8,616,434 B2 | 12/2013 | Wilen |
| D697,584 S | 1/2014 | Schmon |
| D698,008 S | 1/2014 | Schmon et al. |
| 8,626,674 B2 | 1/2014 | Whitehouse |
| 8,642,131 B2 | 2/2014 | Nolte et al. |
| D704,300 S | 5/2014 | Li |
| 8,757,182 B2 | 6/2014 | Schmon |
| 8,807,460 B2 | 8/2014 | Charpie et al. |
| 8,857,732 B2 | 10/2014 | Brose |
| D720,015 S | 12/2014 | Kruse |
| D720,041 S | 12/2014 | Robinson |
| 8,899,501 B2 | 12/2014 | Fox et al. |
| D721,785 S | 1/2015 | Gehrung |
| 8,925,836 B2 | 1/2015 | Dettlaff |
| D733,369 S | 6/2015 | Tschan |
| D733,453 S | 7/2015 | Tschan |
| D734,428 S | 7/2015 | Wang |
| D734,429 S | 7/2015 | Wang |
| D734,571 S | 7/2015 | Tschan |
| 9,073,068 B2 | 7/2015 | Krayer et al. |
| D737,126 S | 8/2015 | Tschan |
| D740,393 S | 10/2015 | Gehrung |
| D745,636 S | 12/2015 | Lin |
| 9,220,853 B2 | 12/2015 | Vogt |
| D757,216 S | 5/2016 | Gherung |
| D758,533 S | 6/2016 | Dettlaff |
| D758,537 S | 6/2016 | Gehrung |
| D768,820 S | 10/2016 | Binz |
| D770,593 S | 11/2016 | Gehrung |
| 9,498,788 B2 | 11/2016 | Kosaka |
| 9,533,317 B2 | 1/2017 | Gehrung |
| D792,557 S | 7/2017 | Wang |
| D794,756 S | 8/2017 | Wang |
| 9,782,784 B2 | 10/2017 | Schmon et al. |
| 9,878,336 B2 | 1/2018 | Gehrung |
| 9,878,340 B2 | 1/2018 | Schmon et al. |
| D835,235 S | 12/2018 | Gehrung et al. |
| 10,189,037 B2 | 1/2019 | Schmon et al. |
| 10,247,313 B2 | 4/2019 | Chien |
| 10,464,076 B2 | 11/2019 | Sata |
| 10,471,449 B2 | 11/2019 | Gehrung |
| 10,702,879 B2 | 7/2020 | Gehrung |
| D929,838 S | 9/2021 | Tschan |
| 11,141,747 B2 | 10/2021 | Schmon |
| 2001/0004996 A1 | 6/2001 | Schmon |
| 2001/0040192 A1 | 11/2001 | Kaneko et al. |
| 2002/0092928 A1 | 7/2002 | Conroy |
| 2002/0134861 A1 | 9/2002 | Petrie et al. |
| 2002/0148501 A1 | 10/2002 | Shieh |
| 2002/0170978 A1 | 11/2002 | Mohn |
| 2003/0006322 A1* | 1/2003 | Hartle ............... B05B 7/1209 239/691 |
| 2003/0025000 A1 | 2/2003 | Schmon |
| 2003/0066218 A1 | 4/2003 | Schweikert |
| 2003/0121476 A1 | 7/2003 | McIntyre et al. |
| 2003/0127046 A1 | 7/2003 | Zehner et al. |
| 2003/0164408 A1 | 9/2003 | Schmon |
| 2003/0173419 A1 | 9/2003 | Huang |
| 2003/0177979 A1 | 9/2003 | Crum et al. |
| 2003/0189105 A1 | 10/2003 | Schmon |
| 2003/0209568 A1 | 11/2003 | Douglas et al. |

(56) References Cited

U.S. PATENT DOCUMENTS

| | | |
|---|---|---|
| 2003/0213857 A1 | 11/2003 | Schmon et al. |
| 2003/0218596 A1 | 11/2003 | Eschler |
| 2003/0230636 A1 | 12/2003 | Rogers |
| 2004/0046051 A1 | 3/2004 | Santa Cruz et al. |
| 2004/0050432 A1 | 3/2004 | Breda |
| 2004/0104194 A1 | 6/2004 | Dennison |
| 2004/0129738 A1 | 7/2004 | Stukas |
| 2004/0140373 A1 | 7/2004 | Joseph et al. |
| 2004/0155063 A1 | 8/2004 | Hofeldt |
| 2004/0159720 A1 | 8/2004 | Komornicki |
| 2004/0177890 A1 | 9/2004 | Weinmann |
| 2004/0191406 A1 | 9/2004 | Crum et al. |
| 2004/0217201 A1 | 11/2004 | Ruda |
| 2004/0233223 A1 | 11/2004 | Schkolne et al. |
| 2004/0245208 A1 | 12/2004 | Dennison |
| 2005/0001060 A1 | 1/2005 | Robinson |
| 2005/0056613 A1 | 3/2005 | King |
| 2005/0082249 A1 | 4/2005 | King |
| 2005/0127201 A1 | 6/2005 | Matsumoto |
| 2005/0145723 A1 | 7/2005 | Blette et al. |
| 2005/0145724 A1 | 7/2005 | Blette et al. |
| 2005/0161525 A1 | 7/2005 | Johansson |
| 2005/0178854 A1 | 8/2005 | Dodd |
| 2005/0189445 A1 | 9/2005 | Hartle et al. |
| 2005/0215284 A1 | 9/2005 | Su |
| 2005/0218246 A1 | 10/2005 | Chatron |
| 2005/0220943 A1 | 10/2005 | Abrams et al. |
| 2005/0248148 A1 | 11/2005 | Schenck et al. |
| 2005/0252993 A1 | 11/2005 | Rogers |
| 2005/0252994 A1 | 11/2005 | Rogers |
| 2005/0268949 A1 | 12/2005 | Rosa |
| 2005/0284963 A1 | 12/2005 | Reedy |
| 2006/0000927 A1 | 1/2006 | Ruda |
| 2006/0007123 A1 | 1/2006 | Wilson et al. |
| 2006/0048803 A1 | 3/2006 | Jessup et al. |
| 2006/0081060 A1 | 4/2006 | Forster |
| 2006/0108449 A1 | 5/2006 | Sodemann |
| 2006/0113409 A1 | 6/2006 | Camilleri et al. |
| 2006/0118661 A1 | 6/2006 | Hartle |
| 2006/0131151 A1 | 6/2006 | Marchand |
| 2006/0171771 A1 | 8/2006 | Kruse |
| 2006/0192377 A1 | 8/2006 | Bauer et al. |
| 2006/0196891 A1 | 9/2006 | Gerson et al. |
| 2007/0029788 A1 | 2/2007 | Adler |
| 2007/0055883 A1 | 3/2007 | Kruse |
| 2007/0131795 A1 | 6/2007 | Abbate et al. |
| 2007/0158349 A1 | 7/2007 | Schmon et al. |
| 2007/0205305 A1 | 9/2007 | Vagedes |
| 2007/0221754 A1 | 9/2007 | Gehrung |
| 2007/0228190 A1 | 10/2007 | Tanner |
| 2007/0252378 A1 | 11/2007 | Chambers |
| 2007/0262169 A1 | 11/2007 | Wang |
| 2007/0262172 A1 | 11/2007 | Huffman |
| 2008/0011879 A1 | 1/2008 | Gerson et al. |
| 2008/0019789 A1 | 1/2008 | Dunaway et al. |
| 2008/0029619 A1 | 2/2008 | Gohring et al. |
| 2008/0128533 A1 | 6/2008 | Gehrung |
| 2008/0179763 A1 | 7/2008 | Schmon et al. |
| 2008/0251607 A1 | 10/2008 | Krayer |
| 2008/0251977 A1 | 10/2008 | Naruse et al. |
| 2008/0264892 A1 | 10/2008 | Nozawa |
| 2008/0272213 A1 | 11/2008 | Ting |
| 2008/0296410 A1 | 12/2008 | Carey et al. |
| 2009/0014557 A1 | 1/2009 | Schmon et al. |
| 2009/0026288 A1 | 1/2009 | Shih |
| 2009/0026290 A1 | 1/2009 | Fox |
| 2009/0045623 A1 | 2/2009 | Schmon |
| 2009/0072050 A1 | 3/2009 | Ruda |
| 2009/0078789 A1 | 3/2009 | Kruse |
| 2009/0078790 A1 | 3/2009 | Camilleri et al. |
| 2009/0143745 A1 | 6/2009 | Langan et al. |
| 2009/0152382 A1 | 6/2009 | Charpie |
| 2009/0179081 A1 | 7/2009 | Charpie |
| 2009/0183516 A1 | 7/2009 | Appler et al. |
| 2009/0235864 A1 | 9/2009 | Khoury et al. |
| 2009/0266915 A1 | 10/2009 | Fedorov |
| 2010/0021646 A1 | 1/2010 | Nolte et al. |
| 2010/0059533 A1 | 3/2010 | Unger et al. |
| 2010/0084493 A1 | 4/2010 | Troudt |
| 2010/0108783 A1 | 5/2010 | Joseph et al. |
| 2010/0126541 A1 | 5/2010 | Schmon |
| 2010/0163649 A1 | 7/2010 | Bass et al. |
| 2010/0206963 A1 | 8/2010 | Huang |
| 2010/0270390 A1 | 10/2010 | Reitz |
| 2010/0270400 A1 | 10/2010 | Evar et al. |
| 2011/0024524 A1 | 2/2011 | Fox |
| 2011/0125607 A1 | 5/2011 | Wilen |
| 2011/0121103 A1 | 6/2011 | Carleton et al. |
| 2011/0127767 A1 | 6/2011 | Wicks et al. |
| 2011/0168811 A1 | 7/2011 | Fox et al. |
| 2011/0174901 A1 | 7/2011 | Dettlaff et al. |
| 2012/0012671 A1 | 1/2012 | Brose et al. |
| 2012/0097762 A1 | 4/2012 | Gehrung et al. |
| 2012/0132550 A1 | 5/2012 | Gerson et al. |
| 2012/0160935 A1 | 6/2012 | Krayer et al. |
| 2012/0187220 A1 | 7/2012 | Micheli et al. |
| 2013/0056556 A1 | 3/2013 | Schmon et al. |
| 2013/0074864 A1 | 3/2013 | Nuzzo et al. |
| 2013/0092760 A1 | 4/2013 | Joseph |
| 2013/0266734 A1 | 10/2013 | Nolte et al. |
| 2013/0320110 A1 | 12/2013 | Brose et al. |
| 2014/0034757 A1 | 2/2014 | Kaneko |
| 2014/0048627 A1 | 2/2014 | Schmon et al. |
| 2014/0059905 A1 | 3/2014 | Raming |
| 2014/0145003 A1 | 5/2014 | Schmon et al. |
| 2014/0263686 A1 | 9/2014 | Hedger |
| 2014/0305962 A1 | 10/2014 | Tschan |
| 2014/0339322 A1 | 11/2014 | Freers |
| 2014/0346257 A1 | 11/2014 | Reetz, III et al. |
| 2015/0108254 A1 | 4/2015 | Commette |
| 2015/0165463 A1 | 6/2015 | Gehrung |
| 2015/0231655 A1 | 8/2015 | Adams et al. |
| 2016/0030960 A1 | 2/2016 | Gehrung |
| 2017/0252771 A1 | 9/2017 | Young |
| 2017/0304852 A1 | 10/2017 | Bierie |
| 2018/0050355 A1 | 2/2018 | Delsard |
| 2018/0050356 A1 | 2/2018 | Gehrung |
| 2018/0050361 A1 | 2/2018 | Gehrung |
| 2018/0050362 A1 | 2/2018 | Sata |
| 2018/0133727 A1 | 5/2018 | Schmon et al. |
| 2018/0200740 A1 | 7/2018 | Rossbach et al. |
| 2020/0038889 A1 | 2/2020 | Volk |
| 2021/0379612 A1 | 12/2021 | Volk |
| 2022/0048054 A1 | 2/2022 | Maier |
| 2022/0080448 A1 | 3/2022 | Volk |
| 2023/0107860 A1 | 4/2023 | Maier |
| 2023/0149955 A1 | 5/2023 | Maier |

FOREIGN PATENT DOCUMENTS

| | | |
|---|---|---|
| AT | 250467 | 10/2003 |
| AT | 322645 | 4/2006 |
| AT | 383910 | 2/2008 |
| AT | 461752 | 4/2010 |
| AT | 461753 | 4/2010 |
| AT | 475488 | 8/2010 |
| AU | 637187 | 5/1993 |
| AU | 2002352235 | 9/2003 |
| AU | 2004315547 | 8/2005 |
| AU | 2005205899 | 8/2005 |
| AU | 2011257605 | 11/2012 |
| AU | 2011361295 | 5/2013 |
| CA | 521511 | 2/1956 |
| CA | 2126957 | 1/1995 |
| CA | 2277096 | 7/1998 |
| CA | 2445183 | 10/2002 |
| CA | 2552390 | 8/2005 |
| CA | 2555607 | 8/2005 |
| CA | 2690112 | 5/2009 |
| CA | 2797990 | 12/2011 |
| CA | 2812684 | 9/2012 |
| CA | 102917803 | 2/2013 |
| CA | 2850401 A1 | 5/2013 |
| CH | 200754 A | 10/1938 |

(56) References Cited

FOREIGN PATENT DOCUMENTS

| | | |
|---|---|---|
| CH | 203 668 | 6/1939 |
| CH | 523 098 A | 5/1972 |
| CH | 523098 A | 5/1972 |
| CH | 542104 A | 9/1973 |
| CH | 676208 | 12/1990 |
| CN | 2136077 Y | 6/1993 |
| CN | 1738310 A | 2/2006 |
| CN | 1899704 A | 1/2007 |
| CN | 1902002 | 1/2007 |
| CN | 1909970 | 2/2007 |
| CN | 1909971 | 2/2007 |
| CN | 1917960 | 2/2007 |
| CN | 200954482 | 10/2007 |
| CN | 101125316 | 2/2008 |
| CN | 201064746 Y | 5/2008 |
| CN | 100430150 | 11/2008 |
| CN | 100455360 | 1/2009 |
| CN | 101367066 | 2/2009 |
| CN | 100478080 | 4/2009 |
| CN | 101516523 A | 8/2009 |
| CN | 101646500 | 2/2010 |
| CN | 102211070 | 4/2011 |
| CN | 102139249 A | 8/2011 |
| CN | 102211069 | 10/2011 |
| CN | 202667052 U | 1/2013 |
| CN | 103 521 278 A | 1/2014 |
| CN | 103 521 378 A | 1/2014 |
| CN | 103521378 A | 1/2014 |
| CN | 203508251 U | 4/2014 |
| CN | 203737474 U | 7/2014 |
| CN | 204074345 U | 1/2015 |
| CN | 204294401 U | 4/2015 |
| CN | 105377447 A | 3/2016 |
| CN | 205966208 U | 2/2017 |
| CN | 107427851 A | 12/2017 |
| CN | 107666966 A | 2/2018 |
| CN | 108223901 A | 6/2018 |
| CN | 207493903 U | 6/2018 |
| CN | 108438227 A | 8/2018 |
| DE | 259621 C | 5/1913 |
| DE | 460381 | 5/1928 |
| DE | 510362 | 10/1930 |
| DE | 611325 C | 3/1935 |
| DE | 1425890 | 11/1968 |
| DE | 2559036 | 9/1976 |
| DE | 2653981 | 6/1978 |
| DE | 2950341 | 7/1980 |
| DE | 2926286 A1 | 1/1981 |
| DE | 3016419 | 11/1981 |
| DE | 8024829.9 | 9/1982 |
| DE | 3111571 A1 | 10/1982 |
| DE | 3238149 A1 | 4/1984 |
| DE | 34 02 097 | 8/1985 |
| DE | 3402945 A1 | 8/1985 |
| DE | 3517122 | 5/1986 |
| DE | 3505618 | 8/1986 |
| DE | 3526819 | 2/1987 |
| DE | 3016419 C2 | 8/1987 |
| DE | 8702559 | 10/1987 |
| DE | 3708472 A1 | 10/1988 |
| DE | 8902223 | 5/1989 |
| DE | 3742308 | 6/1989 |
| DE | 8905681 | 11/1989 |
| DE | G 90 01 265 | 5/1990 |
| DE | 3906219 | 8/1990 |
| DE | 4302911 | 8/1993 |
| DE | 4208500 A1 | 9/1993 |
| DE | 4230535 | 3/1994 |
| DE | G 94 16 015.5 U1 | 11/1994 |
| DE | 4321940 | 1/1995 |
| DE | 692 11 891 T2 | 10/1996 |
| DE | 69211891 T2 | 10/1996 |
| DE | 19516485 | 11/1996 |
| DE | 19727884 | 2/1999 |
| DE | 69505433 T2 | 4/1999 |
| DE | 19807973 | 7/1999 |
| DE | 19824264 | 12/1999 |
| DE | 19832990 | 1/2000 |
| DE | 20000483 | 8/2000 |
| DE | 10004105 | 10/2000 |
| DE | 19958569 | 2/2001 |
| DE | 199 41 362 | 3/2001 |
| DE | 199 45 760 | 3/2001 |
| DE | 19945760 | 3/2001 |
| DE | 10103221 A1 | 8/2001 |
| DE | 10031857 | 1/2002 |
| DE | 10031858 | 1/2002 |
| DE | 20114257 | 2/2002 |
| DE | 10059406 | 6/2002 |
| DE | 10135104 | 9/2002 |
| DE | 10135104 C1 | 9/2002 |
| DE | 102 05 831 | 8/2003 |
| DE | 10205831 | 8/2003 |
| DE | 10311238 | 10/2004 |
| DE | 10 2004 027 789 | 2/2005 |
| DE | 29825120 | 2/2005 |
| DE | 102004027789 A1 | 2/2005 |
| DE | 69827994 T2 | 4/2005 |
| DE | 20320781 | 6/2005 |
| DE | 10 2004 014 646 | 7/2005 |
| DE | 10 2004 003 438 | 8/2005 |
| DE | 102004003439 | 8/2005 |
| DE | 10 2004 007 733 | 9/2005 |
| DE | 10 2004 021 298 | 11/2005 |
| DE | 699 28 944 T2 | 9/2006 |
| DE | 69928944 T2 | 9/2006 |
| DE | 69535077 T2 | 11/2006 |
| DE | 202007001031 | 3/2007 |
| DE | 60200500 1173 | 8/2007 |
| DE | 60206956 T2 | 8/2008 |
| DE | 102007006547 | 8/2008 |
| DE | 102007013628 A1 | 9/2008 |
| DE | 102007039106 | 2/2009 |
| DE | 102007052067 | 5/2009 |
| DE | 10 2009 020 194 A1 | 11/2010 |
| DE | 20 2010 012 449 U1 | 12/2010 |
| DE | 202010012449 | 12/2010 |
| DE | 202010012449 U1 | 12/2010 |
| DE | 10 2009 032 399 A1 | 1/2011 |
| DE | 102009032399 A1 | 1/2011 |
| DE | 102009053449 | 2/2011 |
| DE | 102010060086 | 4/2012 |
| DE | 10 2010 056 263 A1 | 6/2012 |
| DE | 102010056263 A1 | 6/2012 |
| DE | 102011106060 | 1/2013 |
| DE | 102011118120 | 5/2013 |
| DE | 10 2011 120 717 A1 | 6/2013 |
| DE | 112007001824 B4 | 7/2013 |
| DE | 10 2012 013 464 A1 | 11/2013 |
| DE | 102015114202 A1 | 1/2017 |
| DE | 10 2018 118 737 A1 | 2/2020 |
| DE | 10 2018 118737 A1 | 2/2020 |
| EM | 002066910-0001 | 3/2013 |
| EM | 002066910-0002 | 3/2013 |
| EM | 002066910-0003 | 3/2013 |
| EM | 002066910-0004 | 3/2013 |
| EM | 002066910-0005 | 3/2013 |
| EM | 002066910-0006 | 3/2013 |
| EM | 002066910-0007 | 3/2013 |
| EM | 002066910-0008 | 3/2013 |
| EM | 002066910-0009 | 3/2013 |
| EM | 002066910-0010 | 3/2013 |
| EP | 0092043 A2 | 10/1983 |
| EP | 0092392 | 10/1983 |
| EP | 0114064 A2 | 7/1984 |
| EP | 0313958 A2 | 5/1989 |
| EP | 524408 | 1/1993 |
| EP | 567325 | 10/1993 |
| EP | 0631821 | 1/1995 |
| EP | 0650766 | 5/1995 |
| EP | 0650766 A2 | 5/1995 |
| EP | 678334 | 10/1995 |
| EP | 0706832 | 4/1996 |
| EP | 0706832 A1 | 4/1996 |

(56) References Cited

FOREIGN PATENT DOCUMENTS

| | | |
|---|---|---|
| EP | 0710506 | 5/1996 |
| EP | 801002 | 10/1997 |
| EP | 0846498 A1 | 6/1998 |
| EP | 987060 | 3/2000 |
| EP | 1081639 | 3/2001 |
| EP | 1106262 | 6/2001 |
| EP | 1 247 586 | 10/2002 |
| EP | 1247586 | 10/2002 |
| EP | 1277519 | 1/2003 |
| EP | 1294490 | 3/2003 |
| EP | 1299194 | 4/2003 |
| EP | 1366823 | 12/2003 |
| EP | 1412669 | 4/2004 |
| EP | 1424135 | 6/2004 |
| EP | 1477232 A1 | 11/2004 |
| EP | 1479447 A1 | 11/2004 |
| EP | 1504823 A1 | 2/2005 |
| EP | 1563913 | 8/2005 |
| EP | 1574262 | 9/2005 |
| EP | 1602412 | 12/2005 |
| EP | 1658902 A1 | 5/2006 |
| EP | 1708822 | 10/2006 |
| EP | 1708823 | 10/2006 |
| EP | 1718415 | 11/2006 |
| EP | 1880771 A1 | 1/2008 |
| EP | 1902766 A1 | 3/2008 |
| EP | 1902786 | 3/2008 |
| EP | 1902876 | 3/2008 |
| EP | 1930084 | 6/2008 |
| EP | 1964616 | 9/2008 |
| EP | 1964616 A2 | 9/2008 |
| EP | 1987886 A2 | 11/2008 |
| EP | 1997561 A2 | 12/2008 |
| EP | 2017010 A2 | 1/2009 |
| EP | 2027931 | 2/2009 |
| EP | 2092987 A1 | 8/2009 |
| EP | 2106298 | 10/2009 |
| EP | 2111920 | 10/2009 |
| EP | 2127758 A1 | 12/2009 |
| EP | 2451586 A1 | 5/2012 |
| EP | 2490819 | 8/2012 |
| EP | 2576079 | 4/2013 |
| EP | 2608890 | 7/2013 |
| EP | 2 669 213 A1 | 12/2013 |
| EP | 2703089 A1 | 3/2014 |
| EP | 2736651 B1 | 6/2014 |
| EP | 2 828 000 A | 1/2015 |
| EP | 2 828 000 A1 | 1/2015 |
| EP | 3184177 A1 | 6/2017 |
| EP | 2828000 B1 | 8/2019 |
| FR | 398333 | 6/1909 |
| FR | 789762 | 11/1935 |
| FR | 1410519 | 9/1964 |
| FR | 2444501 | 7/1980 |
| FR | 2462200 A1 | 2/1981 |
| FR | 2 570 140 | 3/1986 |
| FR | 2 774 928 | 8/1999 |
| FR | 2863512 A1 | 6/2005 |
| FR | 2927824 A1 | 8/2009 |
| GB | 190900523 | 6/1909 |
| GB | 657854 A | 9/1951 |
| GB | 2 132 916 | 7/1984 |
| GB | 2153260 | 8/1985 |
| GB | 2372465 | 8/2002 |
| GB | 2411235 | 8/2005 |
| GB | 2416141 A | 1/2006 |
| GB | 2444909 A | 6/2008 |
| HK | 1100405 | 6/2009 |
| HK | 1096057 | 7/2009 |
| HK | 1125067 | 8/2012 |
| HK | 1138533 | 11/2012 |
| JP | S49-136868 U | 11/1974 |
| JP | S55-107258 U | 7/1980 |
| JP | S5654328 | 5/1981 |
| JP | S57-75246 | 5/1982 |
| JP | S57128346 A | 8/1982 |
| JP | 58-119862 | 5/1983 |
| JP | S5998757 | 6/1984 |
| JP | S601722 | 1/1985 |
| JP | S62160156 A | 7/1987 |
| JP | H01-87805 | 6/1989 |
| JP | H02258076 A | 10/1990 |
| JP | H04-176352 A | 6/1992 |
| JP | H0530749 | 4/1993 |
| JP | H05172678 | 7/1993 |
| JP | 674850 | 3/1994 |
| JP | H06215741 | 8/1994 |
| JP | H07204542 A | 8/1995 |
| JP | H08196950 | 8/1996 |
| JP | H08196950 A | 8/1996 |
| JP | H09117697 | 5/1997 |
| JP | 11-047643 A | 2/1999 |
| JP | 2000015150 A | 1/2000 |
| JP | 2000070780 A | 3/2000 |
| JP | 2001259487 | 9/2001 |
| JP | 2003042882 | 2/2002 |
| JP | 2003088780 | 3/2003 |
| JP | 2004-501763 A | 1/2004 |
| JP | 2004017044 | 1/2004 |
| JP | 2005000735 A | 1/2005 |
| JP | 2005138885 | 6/2005 |
| JP | 2007516831 | 6/2007 |
| JP | 2008018296 A | 1/2008 |
| JP | 2008161789 A | 7/2008 |
| JP | 2010-528837 A | 8/2010 |
| JP | 2014124274 A | 7/2014 |
| KR | 20140064644 A | 5/2014 |
| RU | 2523816 C1 | 1/2014 |
| TW | 491092 | 6/2002 |
| TW | 510253 U | 11/2002 |
| TW | I220392 | 8/2004 |
| TW | I303587 | 12/2008 |
| TW | I309584 | 5/2009 |
| WO | 90/008456 | 8/1990 |
| WO | 91/16610 | 10/1991 |
| WO | 1992/07346 | 4/1992 |
| WO | 9522409 | 8/1995 |
| WO | 1998/32539 | 7/1998 |
| WO | 01/012337 | 2/2001 |
| WO | 2001/12337 | 2/2001 |
| WO | 0166261 | 9/2001 |
| WO | 01/099062 | 12/2001 |
| WO | 02/000355 | 1/2002 |
| WO | 0202242 | 1/2002 |
| WO | 02/018061 | 3/2002 |
| WO | 02/085533 | 10/2002 |
| WO | 03/007252 | 1/2003 |
| WO | 03/045575 | 6/2003 |
| WO | 03/069208 | 8/2003 |
| WO | 03069208 A1 | 8/2003 |
| WO | 03/086654 A1 | 10/2003 |
| WO | 04/037433 | 5/2004 |
| WO | 2004/37433 | 5/2004 |
| WO | 04/052552 | 6/2004 |
| WO | 05/018815 | 3/2005 |
| WO | 05/068220 | 7/2005 |
| WO | 05/070557 | 8/2005 |
| WO | 05/070558 | 8/2005 |
| WO | 05/077543 | 8/2005 |
| WO | 05/115631 | 12/2005 |
| WO | 2006065850 | 6/2006 |
| WO | 07/128127 | 11/2007 |
| WO | 2007/133386 A2 | 11/2007 |
| WO | 2007/149760 A2 | 12/2007 |
| WO | 2008/093866 A1 | 8/2008 |
| WO | 2009015260 | 1/2009 |
| WO | 2009015260 A2 | 1/2009 |
| WO | 2009/054986 A1 | 4/2009 |
| WO | 2009056424 | 5/2009 |
| WO | 2010019274 A1 | 2/2010 |
| WO | 2010/044864 A1 | 4/2010 |
| WO | 2011047876 | 4/2011 |
| WO | 2011147555 | 12/2011 |
| WO | 2012/013574 A1 | 2/2012 |

(56) References Cited

FOREIGN PATENT DOCUMENTS

| WO | 2012/052255 | A1 | 4/2012 |
|---|---|---|---|
| WO | 2012119664 | | 9/2012 |
| WO | 2013000524 | | 1/2013 |
| WO | 2013016474 | | 1/2013 |
| WO | 2013/131626 | A1 | 9/2013 |
| WO | 2013/142045 | A1 | 9/2013 |
| WO | 2014/006593 | A1 | 1/2014 |
| WO | 2015/125619 | A1 | 8/2015 |
| WO | 2016/127106 | A1 | 8/2016 |
| WO | 2016/188804 | A1 | 12/2016 |
| WO | 2017/096740 | A1 | 6/2017 |
| WO | 2018/197025 | A1 | 10/2017 |
| WO | 2020/053153 | A | 3/2020 |
| WO | 2020/0053153 | A1 | 3/2020 |
| WO | 2020/086977 | A1 | 4/2020 |

OTHER PUBLICATIONS

Final Office Action dated Sep. 4, 2020 for U.S. Appl. No. 15/679,533.
Office Action dated Feb. 19, 2016 for U.S. Appl. No. 14/113,649.
Final Office Action dated Feb. 25, 2016 for U.S. Appl. No. 13/698,417.
Restriction Requirement dated Mar. 25, 2016 for Design U.S. Appl. No. 29/516,082.
Response filed Mar. 31, 2016 to Office Action dated Dec. 31, 2016 for U.S. Appl. No. 14/572,998.
Restriction Requirement Office Action dated Apr. 17, 2017 for U.S. Appl. No. 14/815,210.
Notice of Allowance dated Apr. 10, 2017 for U.S. Appl. No. 29/579,824.
Response to Final Office Action filed May 9, 2017 in U.S. Appl. No. 13/698,417.
Response to Office Action filed May 17, 2017 in U.S. Appl. No. 14/113,649.
Written Opinion dated Sep. 8, 2016 for International Application No. PCT/EP2016/061057 filed May 18, 2016.
Response to Office Action dated Mar. 9, 2020 for U.S. Appl. No. 14/815,210.
Notice of Allowance for U.S. Appl. No. 14/815,210 dated Mar. 25, 2020.
Office Action of U.S. Appl. No. 15/679,461 dated Mar. 31, 2020.
Reply to Office Action filed Oct. 11, 2019 for U.S. Appl. No. 15/679,461.
International Search Report, Written Opinion and International Preliminary Report on Patentability for PCT/EP2004/005381 file May 19, 2004.
International Search Report, Written Opinion and International Preliminary Report on Patentability for PCT/EP2004/011998 filed Oct. 23, 2004.
International Search Report, Written Opinion and International Preliminary Report on Patentability for PCT/EP2005/000435 filed Jan. 18, 2005.
International Search Report, Written Opinion and International Preliminary Report on Patentability for PCT/EP2005/00437 filed Jan. 18, 2005.
International Search Report, Written Opinion and International Preliminary Report on Patentability for PCT/EP2008/063344, filed Oct. 6, 2008.
International Search Report, Written Opinion and International Preliminary Report on Patentability for PCT/EP2010/002392 filed Apr. 20, 2010.
International Search Report, Written Opinion and International Preliminary Report on Patentability for PCT/EP2011/002544 filed May 21, 2011.
International Search Report, Written Opinion and International Preliminary Report on Patentability for PCT/EP2011/066665 filed Sep. 26, 2011.
International Search Report, Written Opinion and International Preliminary Report on Patentability for PCT/EP2010/003399 filed Jun. 7, 2010.
International Search Report, Written Opinion and International Preliminary Report on Patentability for PCT/EP2011/5842 filed Dec. 2, 2010.
International Search Report, Written Opinion and International Preliminary Report on Patentability for PCT/EP2012/01939 filed May 5, 2012.
International Search Report, Written Opinion and International Preliminary Report on Patentability for PCT/EP2009/06992 filed Sep. 29, 2009.
Internet Archive Wayback Machine [online] [captured Sep. 25, 2012] [retrieved on Sep. 8, 2014] retrieved from the Internet URL:http://web.archive.org/web/20120925210554/http://www.sata.com/index.php?id=sal-check&no cache=1&L=11.
JP Office Action issued against JP Patent App. 2012-508926 dated Feb. 25, 2014 with English translation.
Response to Restriction Requirement filed Jul. 27, 2015 to Restriction Requirement dated May 27, 2015 for U.S. Appl. No. 13/991,285.
Application filed Jul. 31, 2015 for U.S. Appl. No. 14/815,210.
Final Office Action dated Aug. 4, 2015 for U.S. Appl. No. 13/380,949.
Notice of Allowance dated Aug. 3, 2015 for U.S. Appl. No. 29/486,232.
Office Action dated Jun. 30, 2017 for U.S. Appl. No. 14/815,210.
Response to Office Action filed Feb. 16, 2016 for U.S. Appl. No. 13/698,417.
Screen shot of a SATA product (SATAjet B) description retrieved on Feb. 12, 2016 from www.sata.com/index.php.
"The Hot Rolling Process;" California Steel; retrieved on Feb. 12, 2016 from http://www.californiasteel.com/GetPublicFile.aspx?id=53.
German Search Report dated Mar. 15, 2016 for Application No. 20 2015 003 664.3, 8 pages.
Chinese Search Report dated Feb. 21, 2019 for Application No. 2016800293781, 3 pages.
Response to Office Action dated Jun. 25, 2018 for U.S. Appl. No. 14/815,210.
Response to Final Office Action dated Aug. 22, 2018 for U.S. Appl. No. 14/113,649.
Notification of the First Office Action with search report dated Aug. 24, 2015 for Chinese Application No. 201280020519.5 (related to U.S. Appl. No. 14/113,649), 13 pages.
Notification of the Second Office Action dated May 16, 2016, for Chinese Application No. 201280020519.5 (related to U.S. Appl. No. 14/113,649), 5 pages.
Japanese Office Action for JP2014-517485 (related to U.S. Appl. No. 14/113,649), dated Jul. 5, 2016, 16 pages.
Office Action dated Dec. 31, 2015 for U.S. Appl. No. 14/572,998.
Notice of Allowance dated Jan. 19, 2016 for Design U.S. Appl. No. 29/539,615.
Notice of Allowance dated Jan. 22, 2016 for U.S. Appl. No. 13/991,285.
International Search Report (dated Jun. 20, 2008), Written Opinion (dated Jun. 20, 2008), and International Preliminary Report on Patentability (dated Sep. 14, 2010) from PCT/US2008/03318 filed Mar. 12, 2008.
Response filed Dec. 7, 2015 to Office Action dated Aug. 7, 2015 for U.S. Appl. No. 13/991,285.
Chinese Search Report for Application No. 2017107135569 dated Aug. 24, 2020 and English translation.
Notice of Allowance dated Sep. 17, 2020 for U.S. Appl. No. 15/679,461.
Notice of Allowance dated Apr. 18, 2016 for U.S. Appl. No. 14/572,998.
Response filed Apr. 27, 2016 to Office Action dated Jan. 29, 2016 for U.S. Appl. No. 13/380,949.
German Search Report dated Apr. 12, 2016 for related German Application No. 10 2015 008 735.5.
European Search Report, dated Jan. 20, 2020, for European U.S. Appl. No. 19/183,380.
Printout from Internet www.ehow.com explaining how to choose a spray gun and stating in item 2 "Nozzle sizes vary between about 1 mm and 2 mm.", printed Sep. 7, 2012 (Exhibit 1023 in IPR 2013-0111).
Printout from Internet www.bodyshopbusiness.com explaining how to choose nozzle setup in paragraph bridging pp. 1 and 2, giving

(56) References Cited

OTHER PUBLICATIONS general rule of thumb of nozzle sizes from 1.3 mm to 2.2 mm, depending on material being sprayed, printed Sep. 7, 2012 (Exhibit 1024 in IPR 2013-0111).
Printout from Internet of pages from brochure of Walther Pilot showing nozzle sizes for spray guns ranging from 0.3 mm to 2.5 mm, dated 2007, (Exhibit 1025 in IPR 2013-0111).
Printout from Internet www.alsacorp.com showing in the paragraph bridging pp. 2 and 3, Model VS-7200 Saber LVLP spray gun with nozzle size 1.3 mm with sizes 1.3 to 2.0 available, printed Aug. 26, 2012 (Exhibit 1026 in IPR 2013-0111).
Printout from Internet of p. 28 from current 3Mtm brochure showing Tip/Nozzle/Air Cap Selection Guide with nozzle sizes from 0.5 mm to 3.0 mm., (Exhibit 1027 in IPR 2013-0111).
Decision by EPO regarding opposition proceedings to revoke patent No. 99926841.0-2425/1108476, corresponding to '387 patent, 2012, (Exhibit 1029 in IPR 2013-0111).
SATA News Publication Dan-Am Jul.-Sep. 1996, (Exhibit 1034 in IPR 2013-0111).
SATA News Publication Dan-Am Oct.-Dec. 1996, (Exhibit 1035 in IPR 2013-0111).
SATA News Publication Dan-Am Apr.-Jun. 1998 (Exhibit 1036 in IPR 2013-0111).
Dan-Am SATA Catalog 6 for spray guns 1991 (Exhibit 1037 in IPR 2013-0111).
Dan-Am SATA Catalog 8 for spray guns 1994 (Exhibit 1038 in IPR 2013-0111).
Dan-Am Catalog 6-51 pp published 1991, (Exhibit 1042 in IPR 2013-0111).
Japanese Industrial Standards B 9809 English translation, 1992 (Exhibit 1049 in IPR 2013-0111).
Japanese Industrial Standards B 9809 revised 1991-03-01 (Exhibit 1050 in IPR 2013-0111).
SATA News, vol. 21, 2009 (Exhibit 2010 in IPR 2013-0111).
Collision Hub TV Document (image from video clip) printed Oct. 9, 2013 (Exhibit 2011 in IPR 2013-0111).
MyRieIsMe.com document from press release printed Oct. 9, 2013 (Exhibit 2012 in IPR 2013-0111).
How to set Air pressure, Utube screenshot printed Oct. 9, 2013 (Exhibit 2013 in IPR 2013-0111).
Ohio EPA Letty to Tony Larimer, response to letter dated Aug. 2006 (Exhibit 2014 in IPR 2013-0111).
Pinahs Ben-Tzvi et al, Aconceptual design . . . , Mechatrronics 17 (2007) p. 1-13 (Exhibit 2015 in IPR2013-0111).
On line ad from Amazon.com printed Oct. 14, 2013 (Exhibit 2017 in IPR 2013-0111).
Rone et al, MEMS-Baed Microdroplet Generation with Integrated Sensing, COMSOL, 2011 (Exhibit 2018 in IPR 2013-0111).
Restriction Requirement Office Action dated Aug. 28, 2018 in U.S. Appl. No. 15/679,533.
Restriction Requirement Office Action dated Aug. 28, 2018 in U.S. Appl. No. 15/679,461.
Notice of Allowance dated Sep. 14, 2018 in U.S. Appl. No. 29/618,945.
Notice of Allowance dated Sep. 14, 2018 in U.S. Appl. No. 14/113,649.
Office Action from U.S. Appl. No. 15/143,698 dated Jan. 5, 2017.
German Search Report for German Application No. 10 2015 016 474.0 dated Aug. 9, 2016, 14 pages.
Notice of Allowance in U.S. Appl. No. 29/556,463, filed Mar. 1, 2016, 9 pages.
Notice of Allowance in U.S. Appl. No. 29/555,656, filed Feb. 24, 2016, 5 pages.
Search Report dated Feb. 22, 2019 for German Patent Application No. 10 2018 118 738.6.
Search Report dated Feb. 8, 2019 for German Patent Application No. 10 2018 118 737.8.
Notice of Allowance dated Jul. 1, 2019 for U.S. Appl. No. 15/379,972.
Notice of Allowance dated Jul. 9, 2019 for U.S. Appl. No. 15/679,482.
Restriction/Species requirement dated Dec. 7, 2020 for U.S. Appl. No. 16/524,838.
Response to Office Action dated Apr. 5, 2019 for U.S. Appl. No. 15/679,461 (29 pages).
Response to Office Action dated Apr. 9, 2019 for U.S. Appl. No. 15/679,533 (22 pages).
Canadian Office Action dated Nov. 21, 2012 for related application CA2741703.
Chinese Search Report dated Dec. 5, 2012 for related application CN200980135429.9.
Chinese Office Action dated Dec. 13, 2012 for related application CN200980135429.9.
German Search Report for DE 20 2008 014 389.6 completed Jul. 13, 2009.
Response to Restriction Requirement filed in U.S. Appl. No. 14/815,210 dated Jun. 19, 2017.
Office Action dated Aug. 7, 2015 for U.S. Appl. No. 13/991,285.
Final Office Action dated Feb. 27, 2020 for U.S. Appl. No. 15/575,549.
Office Action dated Jan. 25, 2019 for U.S. Appl. No. 15/379,972.
Office Action dated Mar. 30, 2020 for U.S. Appl. No. 15/679,533.
Response filed Oct. 6, 2015 to Notice of Non-Compliant Amendment for U.S. Appl. No. 13/698,417.
Notice of Non-Compliant Amendment dated Aug. 10, 2015 for U.S. Appl. No. 13/698,417.
Final Office Action dated Oct. 16, 2015 for U.S. Appl. No. 13/698,417.
Extended European Search Report dated Apr. 17, 2015 for European Application No. 14004167.4.
European Search Report dated May 8, 2017 for Application No. EP16203544.
"Spray Guns/sata.com", Oct. 18, 2015, XP055364928 URL:http://web.archive.org/web/20151018205307/http://www.sata.com/index.php?id=lackierpistolen&L=11 [gefunden am Apr. 13, 2017]; reprinted on Dec. 8, 2017.
"SATAjet 5000 B Lackierpistolen | Bechersysteme | Atemschutz | Filtertechnik | Zubehor So flexibel wie Ihre Aufgaben" Apr. 11, 2017, XP055364477 Gefunden im Internet: URL:https/www.sata.com/uploads/tx_pxspecialcontent/00_SATAjet_5000_B.pdf [gefunden am Apr. 12, 2017]; English translation of full brochure attached.
Amendments submitted to European Patent Office on Dec. 3, 2017 for Application No. EP16203544 (with English translation of chart on p. 3).
Office Action, dated Jan. 15, 2019, for U.S. Appl. No. 15/679,533.
Office Action, dated Jan. 15, 2019, for U.S. Appl. No. 15/679,461.
Final Office Action dated Sep. 23, 2020, for U.S. Appl. No. 15/575,549.
Final Office Action dated Dec. 7, 2017 for U.S. Appl. No. 14/815,210.
Response to Restriction Requirement, filed Oct. 29, 2019, for U.S. Appl. No. 15/575,549.
Response filed Dec. 21, 2015 to Office Action dated Jul. 20, 2015 for U.S. Appl. No. 14/113,649.
Final Office Action dated Aug. 12, 2019 from U.S. Appl. No. 14/815,210.
Response to Final Office Action and RCE dated Nov. 29, 2016 in U.S. Appl. No. 14/113,649.
Office Action, dated Jan. 9, 2019, for U.S. Appl. No. 15/679,482.
Response to Election of Species Requirement and Amendment filed Oct. 15, 2018 from U.S. Appl. No. 15/679,482.
Chinese Search Report dated Jul. 18, 2018 for Application No. 2014103745834 filed Jul. 31, 2014.
DesignView of CN302452159 registered Jun. 5, 2013, printed Oct. 18, 2018.
Second Chinese Office Action dated Jun. 24, 2015 for Chinese Application No. 2011800266029.
Third Chinese Office Action dated Nov. 30, 2015 for Chinese Application No. 2011800266029.
Final Office Action dated Aug. 29, 2016 for U.S. Appl. No. 14/113,649.
Office Action dated Nov. 2, 2016 for U.S. Appl. No. 11/949,122.
Final Office Action in U.S. Appl. No. 14/113,649 dated Jun. 22, 2017.
Response filed in U.S. Appl. No. 15/143,698 dated Jul. 3, 2017.
German Search Report dated Apr. 21, 2017 for application No. 10 2016 009 957.7.

(56) References Cited

OTHER PUBLICATIONS

Response restriction requirement filed May 23, 2016 for Design U.S. Appl. No. 29/516,082.
International Search Report dated Apr. 12, 2019 for PCT/DE2018/100679 filed Aug. 1, 2018.
Written Opinion for PCT/DE2018/100679 filed Aug. 1, 2018.
Notice of Allowance dated Jan. 27, 2016 for Design U.S. Appl. No. 29/510,723.
For U.S. Appl. No. 15/679,533: Interview Summary dated Jun. 17, 2020 Response to Office Action, filed Jun. 30, 2020.
Office Action dated Jun. 12, 2020, for U.S. Appl. No. 15/575,549.
Office Action dated Nov. 18, 2014 for U.S. Appl. No. 14/113,649.
Notice of Allowance dated Nov. 19, 2014 for U.S. Appl. No. 29/486,223.
Office Action dated Dec. 31, 2014 for U.S. Appl. No. 13/380,949.
Restriction Requirement dated Jan. 9, 2015 for Design U.S. Appl. No. 29/469,049.
Response to Office Action filed Dec. 2, 2014 for U.S. Appl. No. 29/487,679.
Notice of Allowance dated Jan. 15, 2015 for Design U.S. Appl. No. 29/490,620.
Office Action dated Jan. 14, 2015 for Design U.S. Appl. No. 29/447,887.
Hercules Paint Gun Washers brochure publish date Jan. 2012, [online], [site visited Jan. 7, 2015], <http://www.herkules.us/pdfs/L00761-Hercules-Gun_Washers-4-page-brochure.pdf>.
Jetclean GUn Cleaner Terry's Auto Supply, google publish date Aug. 4, 2011, [online], [site visited Jan. 7, 2015], <http://secure.terrys.net/viewProduct.php?productID=FT.FHAZ1005>.
Restriction Requirement dated Feb. 6, 2015 for Design U.S. Appl. No. 29/486,232.
Office Action dated Mar. 30, 2015 for U.S. Appl. No. 13/698,417.
Responde to Office Action filed Apr. 14, 2015 to Office Action dated Jan. 14, 2015 for U.S. Appl. No. 29/447,887.
Response filed Jul. 20, 2015 for Office Action dated Mar. 30, 2015 for U.S. Appl. No. 13/698,417.
Notice of Allowance dated Apr. 30, 2015 for U.S. Appl. No. 29/447,887.
Chinese Office Action dated Oct. 28, 2014 and Search Report dared Oct. 15, 2014 for Chinese Application No. 2011800266029.
Australian Examination Report dated Oct. 30, 2012 for Australian Application No. 2010268870.
Notice of Allowance dated Apr. 24, 2015 for Design U.S. Appl. No. 29/486,232.
Restriction Requirement dated Jan. 22, 2015 for U.S. Appl. No. 13/698,417.
Response filed Mar. 23, 2015 to Restriction Requirement dated Jan. 22, 2015 for U.S. Appl. No. 13/698,417.
Response filed Apr. 6, 2015 to Office Action dated Feb. 6, 2015 for US Design U.S. Appl. No. 29/486,232.
Response filed Mar. 31, 2015 to Office Action dated Dec. 31, 2014 for U.S. Appl. No. 13/380,949.
Japanese Office Action dated Jun. 11, 2014 for Japanese Patent Application No. 2012-518769.
Australian Examination Report dated Nov. 11, 2014 for Australian patent Application No. 2011257605.
Japanese Notice of Allowance dated Jan. 13, 2015 for Japanese Patent Application No. 2012/518769.
Application filed Dec. 11, 2011 for U.S. Appl. No. 13/380,949.
Chinese Office Action dated Jan. 28, 2014 and Search Report dated Jan. 21, 2014 for Chinese Application No. 201080030935.4.
Search Report dated Apr. 24, 2010 for German Application No. 10 2009 032 399.6-51.
Application filed Oct. 24, 2013 for U.S. Appl. No. 14/113,649.
Response filed May 18, 2015 to Office Action dated Nov. 18, 2014 for U.S. Appl. No. 14/113,649.
Application filed Dec. 17, 2014 for U.S. Appl. No. 14/572,998.
German Search Report dated Mar. 25, 2014 for German Application No. 202013105779-7.
Application filed Nov. 16, 2012 for U.S. Appl. No. 13/698,417.
Application filed Jun. 2, 2013 for U.S. Appl. No. 13/991,285.
English translation of application filed Aug. 13, 2013 for Application filed Jun. 2, 2013 for U.S. Appl. No. 13/991,285.
Restriction Requirement dated May 27, 2015 for U.S. Appl. No. 13/991,285.
Application filed Jan. 29, 2015 for Design U.S. Appl. No. 29/516,073.
Application filed Jan. 29, 2015 for Design U.S. Appl. No. 29/516,082.
Application filed Mar. 3, 2015, 2015 for Design U.S. Appl. No. 29/519,198.
Final Office Action dated Jul. 20, 2015 for U.S. Appl. No. 14/113,649.
Japanese Office Action dated Sep. 25, 2019, for Japanese Publication No. 2015-149405, 4 pages.
Final Office Action dated Sep. 12, 2018 in U.S. Appl. No. 14/815,210.
European Search Report dated Jan. 24, 2018 for Application No. 17186905.
Response to Final Office Action, dated Nov. 11, 2019, for U.S. Appl. No. 14/815,210, 20 pages.
Office Action, dated Nov. 20, 2019, for U.S. Appl. No. 15/575,549, 12 pages.
Office Action, dated Dec. 9, 2019, for U.S. Appl. No. 14/815,210, 6 pages.
International Search Report dated Aug. 31, 2016 for PCT/EP2016/061057 filed May 18, 2016.
Written Opinion for PCT/EP2016/061057 filed May 18, 2016.
European Search Report dated Feb. 21, 2020 for Application No. 19183382.1.
Response dated Feb. 19, 2020 for U.S. Appl. No. 15/575,549.
International Search Report dated Jul. 14, 2016 for International Application No. PCT/EP2016/000809, filed May 17, 2016.
Written Opinion for International Application No. PCT/EP2016/000809, filed May 17, 2016.
German Search Report for Application No. 10 2016 009 957.7 dated Apr. 21, 2017.
May 22, 2018 Final Office Action for U.S. Appl. No. 14/113,649.
Jun. 25, 2018 Response to Office Action for U.S. Appl. No. 14/815,210.
U.S. Appl. No. 14/815,210 Office Action dated Apr. 3, 2018.
U.S. Appl. No. 14/113,649 Response filed Mar. 3, 2018.
German Search Report dated Apr. 10, 2018 for Application No. 10 2017 118 599.2.
Restriction Requirement dated Mar. 18, 2019, for U.S. Appl. No. 29/596,869.
Office Action dated Mar. 15, 2019, for U.S. Appl. No. 14/815,210.
Response filed May 28, 2019 for U.S. Appl. No. 15/379,972.
Final Office Action for U.S. Appl. No. 15/679,461 dated Jun. 11, 2019.
Final Office Action for U.S. Appl. No. 15/679,533 dated Jul. 12, 2019.
International Preliminary Report on Patentability for PCT/EP2015/001728 filed Aug. 25, 2015.
Final Office Action dated Mar. 16, 2017 from U.S. Appl. No. 13/698,417, 9 pages.
Final Rejection dated Jul. 22, 2021 for U.S. Appl. No. 16/524,838.
Response filed May 5, 2021 for U.S. Appl. No. 16/524,838.
International Preliminary Report on Patentability dated Feb. 2, 2021 and Written Opinion for PCT/DE2018/100679 filed Aug. 1, 2018 (English Translation).
Notice of Allowance dated May 18, 2021 for U.S. Appl. No. 29/730,873.
Anonymous: "DeVilbiss Automotive RefinishingSpray Gun Setup", Jan. 27, 2015 (Jan. 27, 2015), XP055580418, retrieved from the Internet: URLhttps://web.archive.org/web/20150127025402lhttp://www.autorefinishdevilbiss.com.spray-gun-setup.aspx.
Anonymous: "DeVilbiss—Spray Gun Tool on the AppStore", Oct. 19, 2015 (Oct. 19, 2015), XP055580448, retrieved from the Internet: URLhttps://itunes .apple.comlus/app/ devilbiss-spray-gun-tool/id590404917?mt=8.
Office Action dated Aug. 12, 2021 for U.S. Appl. No. 15/679,533.
Office Action dated Feb. 19, 2021 for U.S. Appl. No. 15/575,549.
International Preliminary Report on Patentability, dated Mar. 9, 2021,with Written Opinion for PCT/EP2019/074000, filed Sep. 9, 2019 (English translation) (7 pages).

(56) References Cited

OTHER PUBLICATIONS

International Search Report dated Apr. 12, 2019 and Written Opinion for PCT/DE18/100679, filed Aug. 1, 2018 (21 pages).
International Search Report dated Nov. 13, 2019 for PCT/EP2019/074000, filed Sep. 9, 2019.
Written Opinion or PCT/EP2019/074000, filed Sep. 9, 2019.
German Search Report dated May 26, 2021, for DE 10 2020 123 769.3, with machine translation.
Notice of Allowance dated Jul. 26, 2021, for U.S. Appl. No. 15/575,549.
Office Action dated Dec. 9, 2021 for U.S. Appl. No. 16/524,838.
Office Action dated Feb. 5, 2021 for U.S. Appl. No. 16/524,838.
For U.S. Appl. No. 16/524,838: Response and Request for Continued Exam filed Oct. 22, 2021.
German Search Report dated May 7, 2019 for Application No. 10 2018 122 004.9.
Final Office Action dated Nov. 23, 2021 for U.S. Appl. No. 15/679,533.
Examination Report from the European Patent Office dated Nov. 8, 2021 for European Patent Application No. 19183382.1.
Examination Report from the European Patent Office dated Nov. 23, 2021 for European Patent Application No. 19183380.5.
International Preliminary Report on Patentability with Written Opinion dated Mar. 9, 2021 for PCT/EP2019/074000 filed Sep. 9, 2019.
Search Report dated Jan. 29, 2022, for Chinese Patent Appl. No. 201910704447X, with translation.
For Chinese Application No. 201910704447.X: Search Report, dated Aug. 25, 2022 Second Office Action, dated Sep. 1, 2022.
Final Office Action dated May 12, 2022, for U.S. Appl. No. 16/524,838.
International Preliminary Report on Patentability dated Sep. 6, 2022 with Written Opinion for PCT/EP2021/053940 (English Translation).
International Preliminary Report on Patentability dated Sep. 6, 2022 with Written Opinion for PCT/EP2021/054059 (English Translation).
International Preliminary Report on Patentability dated Sep. 6, 2022 with Written Opinion for PCT/EP2021/054061 (English Translation).
International Search Report and Written Opinion for PCT/EP2021/53940, filed Feb. 18, 2021.
Search Report dated Jan. 7, 2022, for Chinese Patent Appl. No. 2018800961965, with translation.
Office Action dated Apr. 26, 2022 for U.S. Appl. No. 15/679,533.
European Search Report dated Feb. 4, 2022 for Application No. 21191428.8.
International Search Report and Written Opinion for PCT/EP2021/054061, filed Apr. 16, 2021.
Zhu Zhifu, "Simulation and Experimental Study on Spray Characteristics of Gas-Assisted Urea Spray Gun", Aug. 6, 2019, pp. 1-6.
For Chinese Application No. 2018800961965: Search Report, dated Aug. 1, 2022 (English translation) Second Office Action, dated Aug. 12, 2022 (English translation).
Second Office Action dated Aug. 26, 2022 for Chinese Patent Application No. 2019107032612.
Search Report dated Jan. 26, 2022, for Chinese Patent Appl. No. 2019107032612 with translation.
International Search Report and Written Opinion for PCT/EP2021/54059, filed Feb. 18, 2021.
Notification of the Third Office Action dated Feb. 14, 2023 for Chinese Patent Appl. No. 2019107032612, (15 pages).
Office Action dated Mar. 21, 2023 for European Patent Application No. 19 183 382.1 (12 pages).
Office Action dated Dec. 2, 2022 for U.S. Appl. No. 16/524,838.
Office Action dated Mar. 29, 2023 for U.S. Appl. No. 17/264,372.
Third Office Action dated Feb. 15, 2023 for Chinese Patent Application No. 20191070444.X.
Decision on Rejection dated Feb. 10, 2023 for Chinese Patent Application No. 2018800961965.
Search Report dated Jan. 30, 2023 for Chinese Patent Application No. 2018800961965.
For Chinese Patent Application No. 2019800593031 First Office Action dated Apr. 25, 2022 (Eng. translation) Chinese Search Report dated Apr. 19, 2022.

* cited by examiner

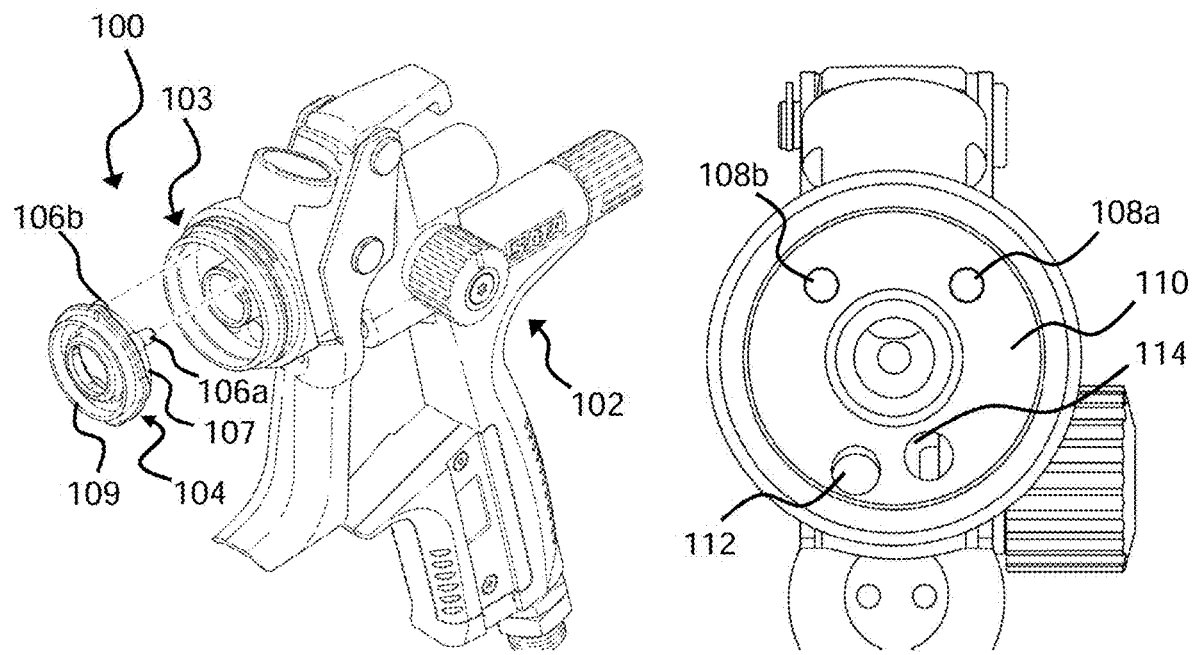
Fig. 1
(Prior Art)
Fig. 2
(Prior Art)
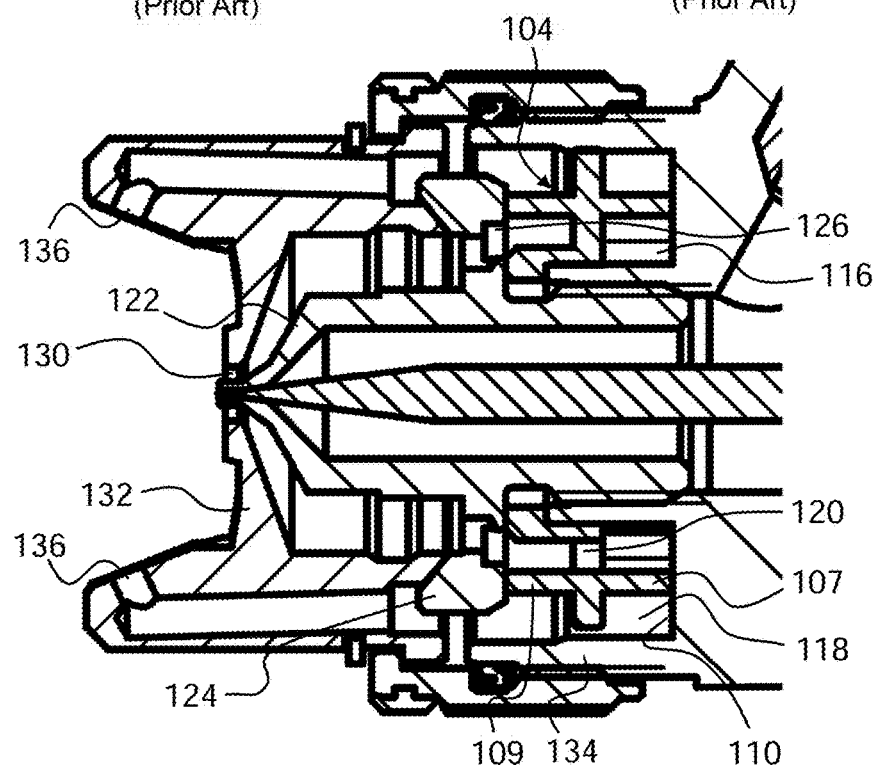
Fig. 3
(Prior Art)

MAIN BODY FOR A SPRAY GUN, SPRAY GUNS, SPRAY GUN SET, METHOD FOR PRODUCING A MAIN BODY FOR A SPRAY GUN AND METHOD FOR CONVERTING A SPRAY GUN

FIELD OF THE DISCLOSURE

The disclosure relates to a main body for a spray gun, in particular a paint spray gun; a spray gun, in particular a paint spray gun; a spray gun set; a method for producing a main body for a spray gun, in particular a paint spray gun; a method for converting a spray gun, in particular a paint spray gun; and a method for converting a spray gun, in particular a paint spray gun.

BACKGROUND

According to the prior art, a spray gun, in particular a paint spray gun, in particular a compressed-air-atomizing paint spray gun, has, on its head, a paint nozzle which is screwed into the gun body. The paint nozzle commonly has, at its front end, a hollow cylindrical spigot, from the front mouth of which the material for spraying emerges during the operation of the spray gun. The paint nozzle may however also be of conical design in its front region. The gun head generally has an external thread by means of which an air nozzle ring with an air cap arranged therein is screwed onto the gun head. The air cap has a central opening, the diameter of which is greater than the outer diameter of the paint nozzle spigot or the outer diameter of the front end of a conical paint nozzle. The central opening of the air cap and the spigot or the front end of the paint nozzle together form a ring-shaped gap. The so-called atomization air emerges from said ring-shaped gap, which atomization air, in the above-described nozzle arrangement, generates a vacuum at the face surface of the paint nozzle, whereby the material for spraying is drawn out of the paint nozzle. The atomization air impinges on the paint jet, whereby the paint jet is broken up into filaments and bands. These filaments and bands break up, owing to their hydrodynamic instability, the interaction between the fast-flowing compressed air and the ambient air, and owing to aerodynamic disturbances, to form droplets, which are blown away from the nozzle by the atomization air.

The air cap furthermore commonly has two horns which are situated diametrically opposite one another and which, in an outflow direction, project beyond said ring-shaped gap and the material outlet opening. From the rear side of the air cap, two supply bores, that is to say horn air feed channels, lead to horn air bores in the horns. In general, each horn has at least one horn air bore, though it is preferable for each horn to have at least two horn air bores, from which the horn air emerges. The horn air bores are generally oriented so as to point towards the nozzle longitudinal axis in an outlet direction downstream of the ring-shaped gap, such that the so-called horn air emerging from the horn air bores can influence the air that has already emerged from the ring-shaped gap or the paint jet or the paint mist that has already at least partially formed. In this way, the paint jet or spray jet with an originally circular cross section (round jet) is compressed at its sides facing toward the horns and is elongated in a direction perpendicular thereto. As a result, a so-called wide jet is formed, which permits a higher surface painting rate. Aside from the deformation of the spray jet, the horn air serves for further atomizing the spray jet.

Air channels are generally formed into the gun body, that is to say the main body of the spray gun, wherein air from one of the channels is, as described above, guided to the stated ring-shaped gap for use as atomization air, and air from another channel is, as described above, guided to the stated horn air openings for use as horn air. For this purpose, the air channels open out in a face surface of the head of the gun body and are guided via an air distribution arrangement to the ring-shaped gap and to the horn air bores respectively. The air distribution arrangement commonly comprises an air distribution ring, which separates the atomization air region and the horn air region from one another. Such a nozzle arrangement or air distribution arrangement is disclosed for example in DE 20 2010 012 449 U1 and in the Chinese utility model specifications ZL 2014 2 0431026.7 and ZL 2016 2 0911120.1.

A disadvantage of the prior art described above, specifically of the air distribution arrangement having an air distribution ring, is that the air distribution ring is produced by the manufacturer of the spray gun as a separate component and must be installed by the manufacturer or by the user of the spray gun. The user must clean and exchange the separate component. Furthermore, there is the risk of loss of the air distribution ring, whereby the spray gun is rendered unusable until the user has obtained a replacement. To realize simple sealing between atomization air region and horn air region, the air distribution ring is produced from plastic. As a result, it is however susceptible to damage. Furthermore, the air distribution rings according to the prior art are of relatively complex design.

US 2007/0262169 A1 cites the Taiwanese utility model specification TW 510253, which discloses a gun head structure, wherein the gun head discloses two ring-shaped grooves which are delimited by three encircling walls on the gun head. The described nozzle structure comprises a sealing disc b, an attachment part c, a nozzle d, a spray head d and a threaded nut f.

Both the gun head structure as per the prior art cited in the US specification and the arrangement described in the cited US specification itself comprise a multiplicity of individual parts, with the disadvantages described above. The individual components are, in part, of relatively filigree design. In the event of damage to just one of the components, there is the risk of a seal no longer being present between the atomization air region and the horn air region, which has a negative influence on the spray jet. Furthermore, the gun head is relatively long owing to the large number of components mounted on one another.

SUMMARY OF THE DISCLOSURE

One aspect of the disclosure therefore relates to a main body for a spray gun, in particular a paint spray gun, and a spray gun, in particular a paint spray gun, which is less susceptible to damage and is functionally reliable.

Another aspect of the disclosure relates to a spray gun set which makes it possible for the user to create a spray gun for different uses.

Another aspect of the disclosure relates to an efficient method for producing a main body for a spray gun, in particular a paint spray gun.

Other aspects of the disclosure relates to methods for converting a spray gun, in particular a paint spray gun, by means of which a spray gun, in particular a paint spray gun, with a first nozzle internal pressure can be easily converted into a spray gun, in particular a paint spray gun, with a second nozzle internal pressure and vice versa.

In an embodiment, a main body for a spray gun, in particular a paint spray gun, has at least one head region for the attachment of a nozzle arrangement, wherein the head region has at least one inner wall, one outer wall and one middle wall arranged in between, wherein the walls are formed in encircling fashion and in one piece with the main body, and wherein the front end of the middle wall is set back in relation to the front end of the outer wall along an axis. Preferably, the front end of the middle wall is set back by 2 mm to 4 mm in relation to the front end of the outer wall along an axis.

The nozzle arrangement which is attachable to the head region may for example comprise a material nozzle, which is frequently also referred to as a paint nozzle, and serves at least for the outlet of the material for spraying, an air cap for the outlet of air and an air nozzle ring for connecting the air cap to the main body.

In the present case, a wall may be understood in particular to mean a web or partition with a thickness of a few millimetres, which extends substantially parallel to the central or longitudinal axis of the head region of the main body or to the central or longitudinal axis of the material nozzle that can be arranged in or on the main body. This may also be a central or longitudinal axis of an upper part of the main body and/or the central or longitudinal axis of a receiving opening for receiving a material flow rate regulating device. The wall is preferably substantially perpendicular to a surface, for example a front surface of the head of the main body, which runs substantially perpendicular to the one or more above-stated central or longitudinal axes. The expressions "inner", "middle" and "outer" wall are to be understood as meaning that, in a view of the gun head from the front, the inner wall is closer in a radial direction to the central point of the gun head than the middle wall, which is in turn closer to the central point of the gun head than the outer wall.

Here, the walls need not be of circular design, and need not have a constant thickness. Rather, they may also be elliptical or oval in some other way or else polygonal, for example square or rectangular, and may be thicker or thinner at at least one point than at at least one other point. It is however preferable for the walls to be of circular design and to have a constant thickness.

The expression formed "in one piece" with the main body means in the present case that the walls and the rest of the main body have been manufactured from one piece, for example by casting, cutting machining, 3D printing or other methods. That is to say, the walls and the main body need not be manufactured separately from one another and subsequently connected to one another. In this way, the number of individual parts can be reduced. It is particularly preferable for the main body to firstly be forged from a bent solid material bar and to subsequently be machined by means of drills, milling cutters or a combination of these.

"Along an axis" is to be understood in the present case to mean along the central or longitudinal axis of the head region of the main body or of the central or longitudinal axis of the material nozzle which can be arranged in or on the main body. Here, "front" is to be regarded as the spraying direction or that side of the main body on which the material nozzle is or can be arranged, and "rear" is to be regarded as the opposite side or opposite direction, on which for example a material flow rate regulating device is or can be arranged. The statement that the front end of the middle wall is "set back" in relation to the front end of the outer wall along an axis means that the front end of the outer wall is further forward than the front end of the middle wall. An advantage here is that the set-back middle wall is better protected against damage than a middle wall which projects beyond the outer wall or a middle wall which is aligned with the outer wall. The middle wall, in particular the front end thereof, that is to say the front edge or the front edge region, is in the present case more critical for the functionality of the main body or of the spray gun than the outer wall, in particular the front end thereof, that is to say the front edge or the front edge region.

The front end of the middle wall is preferably set back by 2 mm to 4 mm in relation to the front end of the outer wall along an axis. In this case, the main body according to the disclosure offers sufficient space, as described in more detail below, for a robust, functionally reliable nozzle or parts thereof.

The statement that the front end of the middle wall is set back in relation to the front end of the outer wall along an axis means that the front edge of the middle wall is at least regionally set back in relation to the front edge of the outer wall along an axis. The front edge of the outer wall need not, over its entire profile, be situated in front of the front edge of the middle wall. Rather, the front edge of the outer wall may regionally also be situated behind the front edge of the middle wall. This also means that the walls need not have a constant height over their entire profile. Rather, the walls may have steps, shoulders, ramps or the like. The walls however preferably have a constant height over their profile, and the front edge of the middle wall is, over its entire profile, set back in relation to the front end of the outer wall along an axis.

Another embodiment of the disclosure relates to a spray gun, in particular a paint spray gun, which comprises a main body as described above and further below.

In this regard, another embodiment of the disclosure relates to a spray gun, in particular a paint spray gun, which has at least one main body, in particular one main body as described above and further below, a nozzle having at least one material nozzle, an air cap, a first air-guiding region and a second air-guiding region, wherein the first air-guiding region guides air which is used for atomizing material for spraying, and the second air-guiding region guides air which is used for influencing a spray jet, wherein the first air-guiding region and the second air-guiding region are at least regionally separated from one another by a middle wall of the main body, a disc element arranged integrally on the material nozzle, at least one impingement disc arranged, in particular captively arranged, on the material nozzle, and by at least one part of the air cap, wherein the middle wall of the main body is of encircling design. By means of the described design, separation or sealing between the first and the second air-guiding region is possible by means of already-existing parts alone, that is to say parts which also perform a function other than the separation of the two regions. No additional sealing element is required, whereby the number of individual parts can be kept low, in order to overcome the above-stated disadvantages or realize the above-stated advantages. The air which is used for atomizing material for spraying and which is guided by the first air-guiding region is commonly referred to as atomization air. The air which is used for influencing a spray jet and which is guided by the second air-guiding region is commonly referred to as horn air. The regions are commonly referred to as atomization air region and horn air region. The disc element may be regarded as part of the material nozzle, such that an impingement disc which is in fact arranged on the disc element can also be regarded as being arranged on the material nozzle. The fact that the impingement disc is "captively" arranged on the material nozzle means in the present case that the impingement disc cannot be removed, or cannot be removed without relatively great effort, from the material nozzle, and the removal is not intended. For example, the impingement disc may be pressed together with or adhesively bonded, riveted or welded to the material nozzle. A strong snap-action connection or a strong screw connection may also render the impingement disc "captive".

Another embodiment of the disclosure relates to a spray gun, in particular a paint spray gun, which comprises at least one main body, in particular one main body as described above and further below, with an outer wall and a middle wall, a nozzle with at least one material nozzle with a hollow portion for guiding through the material for spraying and with a material outlet opening, and a disc element arranged on the outer circumference of the hollow portion, wherein the nozzle furthermore has at least one impingement disc, which at least one impingement disc is arranged on that side of the disc element which is averted from the material outlet opening, and which at least one impingement disc has an inner and an outer circumference, wherein the nozzle is arranged in or on the main body such that a first gap, in particular a first ring-shaped gap, is formed between the outer wall and the at least one impingement disc.

The above statements relating to the middle wall of the main body according to the disclosure may apply correspondingly to the stated middle wall of the spray guns according to the disclosure. With regard also to the single-piece nature of material nozzle and disc element, that which has been described above with regard to the single-piece nature of main body and wall applies analogously, that is to say said main body and wall are manufactured from one-piece, for example by casting, cutting machining, 3D printing or other methods, whereby the advantages already stated can be achieved. Neither the disc element nor the impingement disc need be of cylindrical design, nor need they have a circular outline. Rather, their width and length is merely several times greater than their thickness. Otherwise, both in the case of the disc element and in the case of the impingement disc, the bottom side may in each case have a different shape than the top side, they may have different thicknesses at different points, they may have narrowings or widenings, a top side or bottom side which is elliptical or of some other oval shape, or else may be designed in polygonal form as plates. Furthermore, they may be equipped with openings or grooves or equipped with or connected to further components. The disc element is however preferably designed as a disc or ring with a circular outline, which is arranged concentrically around the material nozzle. In this way, simple production of the material nozzle-disc element unit is possible by means of turning. The same applies to the impingement disc. Both the disc element and the impingement disc may act as throttles, which for example restrict the flow region of air. Both components may alternatively or additionally act as air-diverting element or air-guiding element. They may in particular be used for homogenizing an air stream or multiple air streams. They may serve for distributing an air stream or multiple air streams, which emerge from an air outlet opening or from multiple air outlet openings, over a larger region, such that the air flow is of less punctiform and more areal form. Exemplary embodiments for the components and their function will be discussed in more detail further below.

In this regard, another embodiment of the disclosure relates to a spray gun set comprising at least one main body, in particular one main body as described above and further below, a first nozzle arrangement with a first nozzle and a second nozzle arrangement with a second nozzle, wherein the first nozzle arrangement and/or the first nozzle is a low-pressure nozzle arrangement and/or a low-pressure nozzle, and/or wherein the second nozzle arrangement and/or the second nozzle is a high-pressure nozzle arrangement and/or a high-pressure nozzle. The first nozzle arrangement or the first nozzle and the second nozzle arrangement or the second nozzle may each be exchangeably attachable to the main body. Depending on whether the user requires a low-pressure spray gun or a high-pressure spray gun for their coating task, the user can arrange either the low-pressure nozzle arrangement or the low-pressure nozzle or the high-pressure nozzle arrangement or the high-pressure nozzle in or on the main body, in order to thus create a low-pressure spray gun or a high-pressure spray gun. The differences between low-pressure nozzle arrangement or low-pressure nozzle and high-pressure nozzle arrangement or high-pressure nozzle will be discussed in more detail further below.

Another embodiment of the disclosure relates to a method for producing a main body for a spray gun, in particular a paint spray gun, in particular a main body as described above and further below, wherein the main body has at least the following: an air inlet channel, a first receiving opening for receiving an air flow rate regulating device, a second receiving opening for receiving a material flow rate regulating device, at least one horn air channel and one atomization air channel, a head region with an inner wall, an outer wall and a middle wall arranged in between, wherein the main body is produced in one piece by means of 3D printing.

The advantage of production by means of 3D printing lies in particular in the fact that the entire main body can be produced in a single step. In the case of production by means of forging or casting and subsequent, in particular cutting, machining such as drilling and milling, the component must be inserted into various tools or machines and removed again after the machining process. Furthermore, by means of 3D printing, shapes can be produced which cannot be realized, or can be realized only with difficulty, using conventional manufacturing methods, for example undercuts. Furthermore, practically no material is wasted. The main body produced by means of 3D printing may be produced in particular from plastic or from metal.

Another embodiment of the disclosure relates to a method for converting a spray gun, in particular a paint spray gun, with a first nozzle internal pressure into a spray gun, in particular a paint spray gun, with a second nozzle internal pressure, wherein the first nozzle internal pressure is higher than the second nozzle internal pressure, wherein the method comprises in particular, as one step, removing a high-pressure nozzle arrangement from or out of a main body of the spray gun, wherein the high-pressure nozzle arrangement has at least one nozzle with a material nozzle with a hollow portion for guiding through the material for spraying and with a material outlet opening, and wherein the method comprises, as a further step, arranging a low-pressure nozzle arrangement in or on the main body of the spray gun, wherein the low-pressure nozzle arrangement has at least one nozzle with a material nozzle with a hollow portion for guiding through the material for spraying and with a material outlet opening.

Another embodiment of the disclosure relates to a method for converting a spray gun, in particular a paint spray gun, with a first nozzle internal pressure into a spray gun, in particular a paint spray gun, with a second nozzle internal pressure, wherein the first nozzle internal pressure is lower than the second nozzle internal pressure, wherein the method comprises in particular, as one step, removing a low-pressure nozzle arrangement from or out of a main body of the spray gun, wherein the low-pressure nozzle arrangement has at least one nozzle with a material nozzle with a hollow portion for guiding through the material for spraying and with a material outlet opening, and wherein the method comprises, as a further step, arranging a high-pressure nozzle arrangement in or on the main body of the spray gun, wherein the high-pressure nozzle arrangement has at least one nozzle with a material nozzle with a hollow portion for guiding through the material for spraying and with a material outlet opening.

Spray guns, in particular paint spray guns, operate with different pressure methods. Conventional spray guns operate with relatively high spraying pressures of several bar. In the case of so-called HVLP guns, the nozzle internal pressure is at most 10 psi or 0.7 bar, whereby transfer rates of far higher than 65% are attained. Compliant spray guns in turn have a nozzle internal pressure of more than 10 psi or 0.7 bar, but likewise attain a transfer rate of higher than 65%.

According to the prior art, HVLP spray guns differ structurally from compliant spray guns in particular by the fact that additional throttle tubes are inserted into the air channel mouths in the head of the main body of HVLP spray guns. This necessitates additional production steps, and a spray gun, once it has been configured as an HVLP spray gun, or a main body designed for use for an HVLP spray gun, cannot be converted, or can be converted only with difficulty, into a compliant spray gun or into a compliant spray gun main body, because the throttle tubes must be inserted fixedly into the air channel mouths, for example by being pressed in, in order that an inadvertent detachment is prevented.

One advantage of the first method according to the disclosure for converting a spray gun, in particular a paint spray gun, with a first nozzle internal pressure into a spray gun, in particular a paint spray gun, with a second nozzle internal pressure, wherein the first nozzle internal pressure is higher than the second nozzle internal pressure, lies in the fact that the main body of the spray gun can remain unchanged if, for example, a compliant spray gun is to be converted into an HVLP spray gun. The spray gun can be converted into a spray gun with a lower nozzle internal pressure simply by exchanging the nozzle. The production of separate nozzle tubes and the insertion thereof into the main body of the spray gun can be omitted.

One advantage of the second method according to the disclosure for converting a spray gun, in particular a paint spray gun, with a first nozzle internal pressure into a spray gun, in particular a paint spray gun, with a second nozzle internal pressure, wherein the first nozzle internal pressure is lower than the second nozzle internal pressure, likewise lies in the fact that the main body of the spray gun can remain unchanged if, for example, an HVLP spray gun is to be converted into a compliant spray gun. The spray gun can be converted into a spray gun with a higher nozzle internal pressure simply by exchanging the nozzle. The difficult removal of the nozzle tubes inserted into the main body of the spray gun can be omitted.

In the case of both methods according to the disclosure for converting a spray gun, in particular a paint spray gun, a further advantage lies in the fact that the conversion is still easily possible even after the spray gun has been delivered to the customer.

The nozzle internal pressure of the spray gun is to be understood to mean the pressure that prevails in the air cap of the spray gun. Here, the atomization air region is commonly separated from the horn air region, and a different pressure may prevail in the atomization air region than in the horn air region. The pressures in the atomization air region and in the horn air region may however also be equal. The nozzle internal pressure may for example be measured with the aid of a so-called test air cap. This is a special air cap which is arranged on the spray gun in place of the conventional air cap. The test air cap generally has two manometers, wherein one of these is connected via a bore in the test air cap to the atomization air region, and the other is connected via a further bore in the test air cap to the horn air region.

The terms "low-pressure nozzle arrangement" and "high-pressure nozzle arrangement" are not intended here to mean that the respective nozzle arrangement is used only in classic low-pressure and high-pressure spray guns respectively, or that the spray gun is made into a classic low-pressure, in particular HVLP, spray gun or into a classic high-pressure gun, through the use of the respective nozzle arrangement. Rather, this is merely to be understood to mean that the spray gun, has a higher nozzle internal pressure if it is equipped with the high-pressure nozzle arrangement than if it is equipped with the low-pressure nozzle arrangement. Preferably, the spray gun equipped with the low-pressure nozzle arrangement, or the main body equipped with the low-pressure nozzle arrangement, satisfies the criteria of an HVLP spray gun, and the spray gun equipped with the high-pressure nozzle arrangement, or the main body equipped with the high-pressure nozzle arrangement, satisfies the criteria of a compliant spray gun.

Aside from a nozzle comprising at least one material nozzle with other components possibly arranged thereon, the nozzle arrangement may also have an air cap and an air nozzle ring. All of these components may be designed differently in the case of the low-pressure nozzle arrangement than in the case of the high-pressure nozzle arrangement, though the differences may also be limited to one or a few of the components, whereas the other components are identical in the case of the low-pressure nozzle arrangement and in the case of the high-pressure nozzle arrangement. The differences preferably lie in the material nozzle, or the components arranged thereon, and in the air cap. The differences in the nozzle, the material nozzle or the components arranged thereon may lie in particular in the fact that the nozzle of the low-pressure nozzle arrangement has an additional impingement disc in relation to the nozzle of the high-pressure nozzle arrangement, and that the first impingement disc of the nozzle of the low-pressure nozzle arrangement has a smaller outer circumference than the first impingement disc of the nozzle of the high-pressure nozzle arrangement. The additional impingement disc may in this case act as an additional throttle, which restricts the flow region of air. The additional impingement disc may however also alternatively or additionally perform the above-described functions of the first impingement disc, such as air guidance, air diversion, homogenization and/or air distribution. Furthermore, it is duly possible for both the disc element of the nozzle of the low-pressure nozzle arrangement and the disc element of the nozzle of the high-pressure nozzle arrangement to have passage openings, in particular passage bores, for air, though these may be designed differently, or be present in different number, in the case of the nozzle of the high-pressure nozzle arrangement than in the case of the nozzle of the low-pressure nozzle arrangement. The same applies to the impingement discs. The differences in the air cap preferably lie in the fact that the central opening of the air cap of the low-pressure nozzle arrangement has a greater diameter than the central opening of the air cap of the high-pressure nozzle arrangement. In this way, in the case of a substantially unchanged outer diameter of the front end of the material nozzle, the ring-shaped gap which is formed by the outer surface of the front region of the material nozzle and by the wall that delimits the central opening in the air cap and from which the atomization air emerges is larger in the case of the low-pressure nozzle arrangement than in the case of the high-pressure nozzle arrangement.

Other advantageous embodiments are also disclosed.

It is preferable if the inner wall and the middle wall of the main body according to the disclosure delimit a first air distribution chamber, and the middle wall and the outer wall delimit a second air distribution chamber. This means that they define air distribution chambers of said type preferably together with other walls or surfaces of the main body or walls or surfaces of other components. The air distribution chambers are preferably not closed off, but rather have inlets, outlets and/or passages. The air distribution chambers are preferably of substantially ring-shaped design, though may also have other shapes if this appears advantageous. The chambers are preferably of encircling form, that is to say extend over 360°, though may also be limited to a smaller range. The purpose of the air distribution chambers may be to distribute air, which flows from at least one opening into the air distribution chamber, over a larger area, preferably over 360°. The air distribution chamber between the inner and the middle wall may be referred to as "inner air distribution chamber", and the air distribution chamber between the middle and the outer wall may be referred to as "outer air distribution chamber". The inner air distribution chamber may be the air distribution chamber for atomization air, and the outer air distribution chamber may be the air distribution chamber for horn air.

It is preferable if a first front surface is arranged between the inner wall and the middle wall, and a second front surface is arranged between the middle wall and the outer wall, wherein the first front surface at least regionally has a first spacing to the front end of the outer wall along an axis, wherein the second front surface at least regionally has a second spacing to the front end of the outer wall along an axis, and wherein the first spacing is greater than the second spacing. In the present case, the stated axis is again the central or longitudinal axis of the head region of the main body or the central or longitudinal axis of the material nozzle which can be arranged in or on the main body. The expression "front surface" is intended here to express that the surface points "forward" as per the above definition, in particular in the spraying direction. They are thus substantially perpendicular to the above-stated central or longitudinal axis and perpendicular to the walls between which they are arranged. The front surfaces may form a type of base surface of the above-stated air distribution chambers, and are preferably surfaces of the main body. The first front surface is at least regionally further remote from the front end of the outer wall along the stated axis than the second front surface. The spacings however need not be constant over the entire profile of the front surface. Rather, the front surfaces may also have slopes, steps, depressions, shoulders or the like.

It is preferable if the first spacing, that is to say the spacing of the front surface between the inner and the middle wall to the front end of the outer wall along the axis, amounts to 9 mm to 11 mm, and the second spacing, that is to say the spacing of the front surface between the middle and the outer wall to the front end of the outer wall along the axis, amounts to 4 mm to 6 mm. By means of the different spacings, the inner air distribution chamber can have a greater depth and thus, despite a smaller base area, a larger volume than the outer air distribution chamber. If the air distribution chambers were each regarded as closed-off chambers, with the delimitation realized in each case by the base surface, the two adjacent walls and by an imaginary top surface arranged parallel to the base surface on the lower of the two walls, the volume of the inner air distribution chamber would particularly preferably amount to between 1000 $mm^3$ and 1500 $mm^3$, and the volume of the outer air distribution chamber would particularly preferably amount to between 400 $mm^3$ and 900 $mm^3$.

It is preferable if at least the first front surface and/or the second front surface at least regionally have a groove; it is particularly preferable if at least the second front surface at least regionally has a groove with a base surface, wherein the base surface of the groove has a third spacing to the front end of the outer wall along an axis, in particular the above-stated central or longitudinal axis of the head region of the main body or the central or longitudinal axis of the material nozzle which can be arranged in or on the main body, and wherein the third spacing is smaller than the first spacing of the first front surface to the front end of the outer wall. The base surface of the groove thus lies along the axis between the first front surface and the second front surface. The stated third spacing is made up of the spacing of the second front surface to the front end of the outer wall plus the spacing between the base surface of the groove and the second front surface, that is to say the depth of the groove.

The width of the groove in the first or in the second front surface preferably corresponds substantially to the width of the first front surface or of the second front surface respectively. The groove in the first front surface particularly preferably has substantially the same width as the first front surface, and the groove in the second front surface particularly preferably has substantially the same width as the second front surface. The width of the groove or of the front surface is to be understood here in each case to mean the extent of the head region of the main body in a radial direction or else the spacing between the inner and the middle or between the middle and the outer wall in a radial direction.

It is particularly preferable if the groove extends in a circumferential direction over 25% to 75%, in particular over 45% to 55%, of the circumference of the first front surface or of the second front surface. The first front surface preferably has at least one inner air outlet opening, in particular two inner air outlet openings, and the second front surface has at least one outer air outlet opening, in particular two outer air outlet openings. At least one air outlet opening, in particular one outer air outlet opening, particularly preferably lies within the groove in the front surface. In this way, and in particular owing to the extent of the groove over 25% to 75%, in particular over 45% to 55%, of the circumference of the respective front surface, an even better distribution of the air flowing out of the at least one air outlet opening over the circumference of the air distribution chamber is realized. If the corresponding front surface runs over 360°, then the groove preferably extends over 90° to 270°, in particular over 162° to 198°. The expressions "inner" and "outer" air outlet opening serve merely for distinguishing between the air outlet openings. The at least one "inner" air outlet opening preferably lies further inward in a radial direction, that is to say closer to the central or longitudinal axis of the head region of the main body, than the at least one "outer"

air outlet opening, though they may also have the same spacing to the central or longitudinal axis of the head region of the main body.

It is particularly preferable if the first front surface has two inner air outlet openings and the second front surface has two outer air outlet openings, wherein the outer air outlet openings in the second front surface lie within a groove, and wherein the groove extends over approximately 50% of the circumference of the second front surface.

The at least one inner air outlet opening of the first front surface preferably at least regionally extends over at least 85% of the width of the first front surface and the at least one outer air outlet opening of the second front surface preferably at least regionally extends over at least 85% of the width of the second front surface.

It is particularly preferable if, as already mentioned above, in each case two air outlet openings are situated in the first front surface and in the second front surface. The air outlet openings are in particular bores, wherein it is advantageous for the bore diameter to be as large as possible in order to achieve the highest possible air flow rate. The space for the bores is restricted by the walls, for which reason the bores or generally the air outlet openings should extend as far as possible over the width of the front surfaces.

It is preferable if the main body has at least two atomization air channels which extend from the first front surface into a fan control air distribution chamber, and/or if the main body has at least two horn air channels which extend from the second front surface into a fan control air distribution chamber, wherein the atomization air channels are spaced apart from one another in the region of the first front surface and at least partially overlap in the region of the fan control air distribution chamber, and/or wherein the horn air channels are spaced apart from one another in the region of the second front surface and at least partially overlap in the region of the fan control air distribution chamber. In other words, the first front surface has two mutually spaced-apart atomization air channel mouths, and the second front surface has two mutually spaced-apart horn air channel mouths. The fan control air distribution chamber has only one atomization air channel mouth and one horn air channel mouth. The outer contour of the mouths may in each case have the outer contour of an "8". As a result, the total cross-sectional area of the two air channels is in each case enlarged from the fan control air distribution chamber to the front surfaces.

In a preferred exemplary embodiment of the main body according to the disclosure, the front end of the inner wall is set back in relation to the front end of the middle wall along an axis, in particular the central or longitudinal axis of the head region of the main body or the central or longitudinal axis of the material nozzle which can be arranged in or on the main body. It is particularly preferable if the front end of the inner wall is set back by 0.4 mm to 0.6 mm in relation to the front end of the middle wall along the axis.

The statement that the front end of the inner wall is set back in relation to the front end of the middle wall along an axis means that the front edge of the inner wall is at least regionally set back in relation to the front edge of the middle wall along the axis. The front edge of the middle wall need not, over its entire profile, be situated in front of the front edge of the inner wall. Rather, the front edge of the middle wall may regionally also be situated behind the front edge of the inner wall. This also means that the walls need not have a constant height over their entire profile. Rather, the walls may have steps, shoulders, ramps or the like. The walls however preferably have a constant height over their profile, and the front edge of the inner wall is, over its entire profile, set back in relation to the front end of the middle wall along the axis.

It is particularly preferable if the walls, that is to say the inner, middle and outer wall, are in each case of circular design and arranged concentrically with respect to one another. In this way, the shape can be produced more easily, because it can be realized relatively easily and quickly by turning or by means of a rotationally symmetrical tool. This can preferably be performed in a single step if the contour of the tool corresponds to the contour of the front head region of the main body or constitutes a negative of the contour. The nozzle, which can be arranged in or on the head region, or nozzle arrangement may also thus at least partially be of rotationally symmetrical design.

It is preferable if the inner wall has an outer diameter of 13 mm to 15 mm, the middle wall has an outer diameter of 22 mm to 24 mm, and the outer wall has an outer diameter of 33 mm to 35 mm.

The inner wall may have an inner diameter of 11 mm to 13 mm, the middle wall may have an inner diameter of 20 mm to 22 mm, and the outer wall may have an inner diameter of 31 mm to 33 mm.

It is preferable if the inner wall at least regionally has an internal thread and the outer wall at least regionally has an external thread. It is for example possible for a nozzle, in particular a material nozzle, possibly with further components arranged thereon, to be screwed into the internal thread of the inner wall. It is for example possible for an air nozzle ring to be screwed onto the external thread of the outer wall. The threads may for example be metric threads, trapezoidal threads or other threads. The internal thread of the inner wall should ensure a firm seat of the nozzle in the main body and possibly sealing between the material-guiding and air-guiding regions. The external thread of the outer wall should in particular permit a fast attachment and a fast removal of the air nozzle ring to and from the main body, but also sealing of the air-guiding region with respect to the environment. It is preferable if the internal thread of the inner wall is a V-thread and the external thread of the outer wall is a high-speed thread, in particular a trapezoidal thread.

The nozzle of the spray gun according to the disclosure is preferably arranged in or on the main body such that a second gap, in particular a second ring-shaped gap, is formed between the inner wall and the at least one impingement disc. The impingement disc which forms the second gap together with the inner wall of the main body may be a different impingement disc than that which, as described above, forms a first gap together with the outer wall of the main body. The two impingement discs may be connected to one another as a single piece. The two impingement discs may also be regarded as one impingement disc with different portions. The first gap and the second gap may however also be formed by the same impingement disc.

The at least one impingement disc of the spray gun according to the disclosure preferably has at least one sealing surface which bears sealingly against a counterpart sealing surface on the middle wall of the main body, in particular against a front end of the middle wall of the main body. This arrangement contributes in particular to the sealing, that is to say separation, between a first air-guiding region and a second air-guiding region, in particular between an atomization-air-guiding region and a horn-air-guiding region. The impingement disc and the wall, which in particular perform the above-described functions, thus also contribute to the sealing of the regions, whereby no separate sealing means or sealing element is required.

It is preferable if the at least one impingement disc of the spray gun according to the disclosure is formed from a first portion and a second portion which together form a step, wherein the outer diameter of the step substantially corresponds to the inner diameter of the middle wall of the main body. The outer diameter of the step thus bears against the inner side of the middle wall, which can contribute to the above-described sealing. Furthermore, there is no dead space between the impingement disc and the middle wall that could possibly have a negative effect on the airflow. The first and second portions of the impingement disc may also be regarded as two different impingement discs, which may be connected to one another as a single piece.

It is preferable if the nozzle of the high-pressure nozzle arrangement which, as part of the method according to the disclosure for converting a spray gun, in particular a paint spray gun, with a first nozzle internal pressure into a spray gun, in particular a paint spray gun, with a second nozzle internal pressure, wherein the first nozzle internal pressure is higher than the second nozzle internal pressure, is removed from or out of the main body of the spray gun furthermore has a disc element arranged on the outer circumference of the hollow portion and at least one first impingement disc, wherein the first impingement disc is arranged on that side of the disc element which is averted from the material outlet opening and said first impingement disc has an inner and an outer circumference, and the nozzle of the low-pressure nozzle arrangement which, as part of this method according to the disclosure, is arranged in or on the main body of the spray gun preferably furthermore has a disc element arranged on the outer circumference of the hollow portion and has at least one first impingement disc, wherein the first impingement disc is arranged on that side of the disc element which is averted from the material outlet opening, and said nozzle has an inner and an outer circumference and has a second impingement disc which is arranged on that side of the first impingement disc which is averted from the material outlet opening, wherein the outer circumference of the first impingement disc of the nozzle of the low-pressure nozzle arrangement is smaller than the outer circumference of the first impingement disc of the nozzle of the high-pressure nozzle arrangement.

The method according to the disclosure mentioned immediately above preferably comprises, as one step, removing a high-pressure air cap which is arranged over an air nozzle ring on the main body, wherein the high-pressure air cap has at least one central opening with a first diameter, and, as a further step, arranging a low-pressure air cap which can be arranged over an air nozzle ring on the main body, wherein the low-pressure air cap has at least one central opening with a second diameter, and wherein the second diameter is greater than the first diameter of the high-pressure air cap. Since the central opening of the air cap of the low-pressure nozzle arrangement has a greater diameter than the central opening of the air cap of the high-pressure nozzle arrangement, in the case of a substantially unchanged outer diameter of the front end of the material nozzle, the ring-shaped gap which is situated between the material nozzle and air cap from which the atomization air emerges is larger in the case of the low-pressure nozzle arrangement than in the case of the high-pressure nozzle arrangement. For this reason, too, the pressure in the air cap in the low-pressure nozzle arrangement is lower, and the volume flow of the outflowing air is greater, than in the case of the high-pressure nozzle arrangement.

It is preferable if the nozzle of the low-pressure nozzle arrangement which, as part of the method according to the disclosure for converting a spray gun, in particular a paint spray gun, with a first nozzle internal pressure into a spray gun, in particular a paint spray gun, with a second nozzle internal pressure, wherein the first nozzle internal pressure is lower than the second nozzle internal pressure, is removed from or out of the main body of the spray gun furthermore has a disc element arranged on the outer circumference of the hollow portion and has at least one first impingement disc, wherein the first impingement disc is arranged on that side of the disc element which is averted from the material outlet opening, and said nozzle has an inner and an outer circumference and has a second impingement disc which is arranged on that side of the first impingement disc which is averted from the material outlet opening, and the nozzle of the high-pressure nozzle arrangement which, as part of this method according to the disclosure, is arranged in or on the main body of the spray gun furthermore preferably has a disc element arranged on the outer circumference of the hollow portion and at least one first impingement disc, wherein the first impingement disc is arranged on that side of the disc element which is averted from the material outlet opening and said first impingement disc has an inner and an outer circumference, wherein the outer circumference of the first impingement disc of the nozzle of the high-pressure nozzle arrangement is larger than the outer circumference of the first impingement disc of the nozzle of the low-pressure nozzle arrangement.

The method according to the disclosure mentioned immediately above preferably comprises, as one step, removing a low-pressure air cap which is arranged over an air nozzle ring on the main body, wherein the low-pressure air cap has at least one central opening with a first diameter and, as a further step, arranging a high-pressure air cap which can be arranged over an air nozzle ring on the main body, wherein the high-pressure air cap has at least one central opening with a second diameter, and wherein the second diameter is smaller than the first diameter of the low-pressure air cap.

The method according to the disclosure for converting a spray gun, in particular a paint spray gun, may also be regarded as a method for converting a main body of a spray gun, in particular a paint spray gun, in particular as a method for converting the main body according to the disclosure as described above and further below.

Both the method according to the disclosure for producing a main body and the method according to the disclosure for converting a spray gun may, as a further step, comprise the delivery of the main body or of the spray gun to a customer and/or the use of the main body or of the spray gun.

The statements relating to the main body according to the disclosure, to the spray gun according to the disclosure, to the method according to the disclosure for producing a main body and to the method according to the disclosure for converting a spray gun, in particular the statements relating to the components, may apply throughout, that is to say the statements relating to the main body according to the disclosure may also apply to the spray gun according to the disclosure or to the method according to the disclosure, etc.

The spray gun, in particular the paint spray gun, according to the disclosure may be used for spraying not only paint but also adhesive or lacquer, in particular base coat and clear lacquer, both solvent-based and water-based, as well as liquids for the foodstuff industry, wood protectants or other liquids. The spray gun according to the disclosure may in particular be a handheld spray gun or an automated or robot gun. Handheld spray guns are used in particular by craftspersons, in particular artists, carpenters and painters. Automated and robot guns are generally used in conjunction with a painting robot or a painting machine for industrial applications. It is however by all means conceivable for a handheld spray gun to also be integrated into a painting robot or into a painting machine.

The main body according to the disclosure, the spray gun according to the disclosure and the methods according to the disclosure may be used for all types of spray guns, but in particular for air-atomizing, in particular compressed-air-atomizing, spray guns.

The main body according to the disclosure and the spray gun according to the disclosure may in particular have or be equipped with the following further components: handle, upper gun body, compressed-air connector, paint needle, trigger for opening an air valve and for moving the paint needle out of the material outlet opening of the material nozzle, fan control for setting the ratio of atomization air and horn air for the shaping of the paint jet, air micrometer for setting the spraying pressure, material flow rate regulating device for setting the maximum material volume flow, material attachment, paint channels for guiding the material for spraying from a material inlet to the material outlet opening, hanging hook and/or analogue or digital pressure measuring device. It may however also have further components from the prior art. The paint spray gun may be designed as a flow cup gun with a paint cup arranged above the gun body, from which paint cup the material for spraying flows into and through the paint channels substantially owing to gravitational force and owing to negative pressure at the front end of the material nozzle. The spray gun may however also be a side-cup gun in the case of which the paint cup is arranged laterally on the gun body and in the case of which the material is likewise fed to the gun owing to gravitational force and owing to negative pressure at the front end of the material nozzle. The spray gun may however also be designed as a suction-type or hanging-cup gun with a paint cup which is arranged below the gun body and from which the material for spraying is drawn out of the cup substantially owing to negative pressure, in particular utilizing the Venturi effect. The spray gun may furthermore be designed as a pressurized-cup gun, in the case of which the cup is arranged below, above or on the side of the gun body and is pressurized, whereupon the material for spraying is forced out of the cup. The spray gun may furthermore be a kettle-type gun in the case of which the material for spraying is fed to the spray gun via a hose from a paint container or by means of a pump.

BRIEF DESCRIPTION OF THE DRAWINGS

The disclosure will be discussed in more detail below by way of example on the basis of 18 figures, in which:

FIG. 1 shows a part, shown partially in an exploded view, of a spray gun with air distribution ring according to the prior art disclosed in the Chinese utility model specification ZL 2014 2 0431026.7;

FIG. 2 shows a plan view of a head region of a main body of a spray gun according to the prior art disclosed in the cited Chinese utility model specification;

FIG. 3 shows a sectional view of a head region of a spray gun according to the prior art disclosed in the Chinese utility model specification ZL 2016 2 0911120.1;

DETAILED DESCRIPTION

Figure 4:
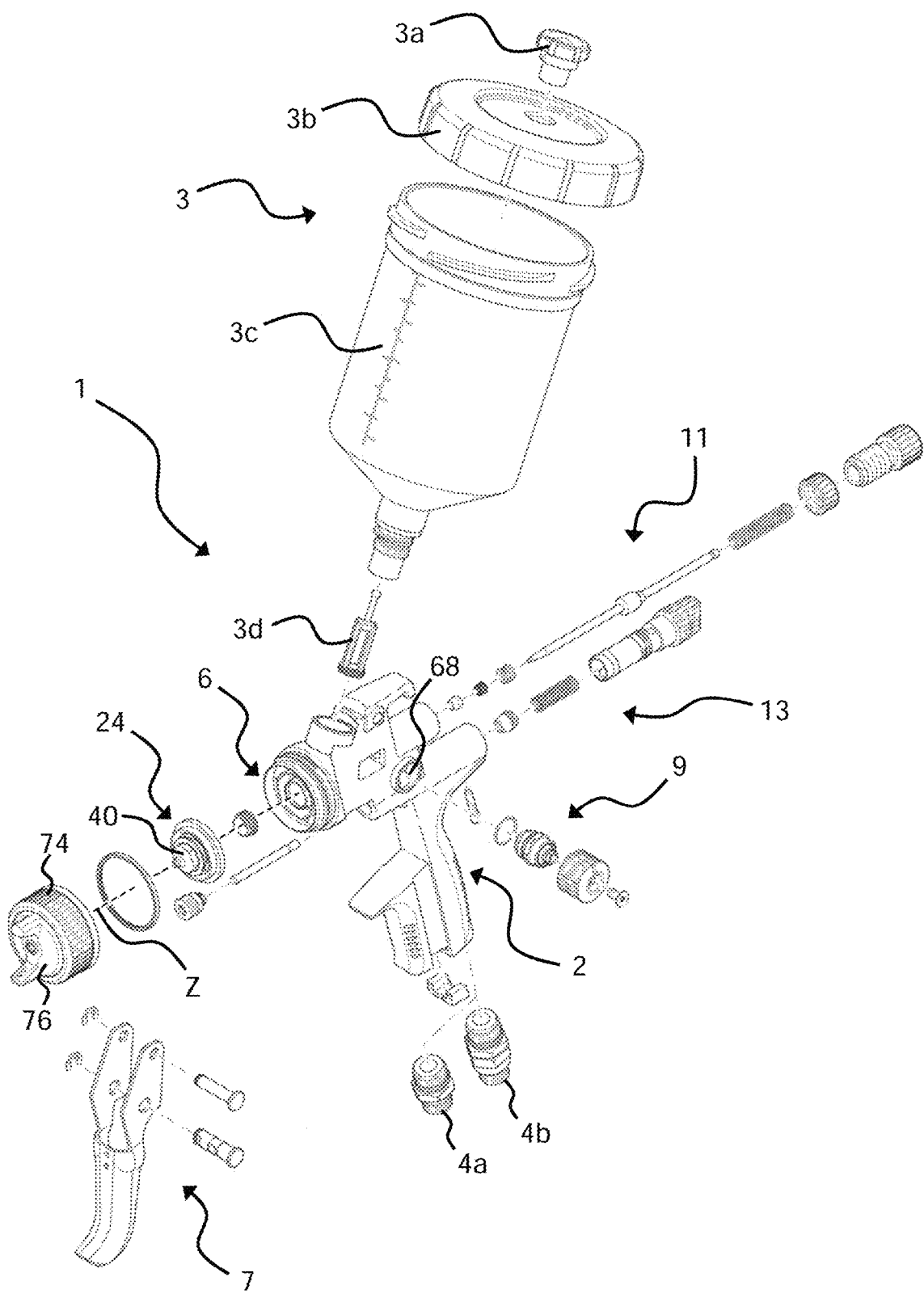
FIG. 4 shows an exploded view of an exemplary embodiment of a spray gun according to the disclosure.

The part of a spray gun 100, in particular a paint spray gun, according to the prior art which is shown in FIG. 1 has a main body 102 with various attachment parts. The figure shows an air distribution ring 104, which can be arranged on the head region 103 of the main body 102. For this purpose, the air distribution ring 104 has at least one, in the present example two, holding pins 106a and 106b, which are inserted into two blind holes 108a and 108b which correspond with the holding pins 106a and 106b and which are illustrated in FIG. 2, in order to fasten the air distribution ring 104 to the gun head or to the head region 103 of the main body 102 such that the wall 107 of the air distribution ring 104 bears sealingly against the front surface 110 of the head region 103 of the main body 102, as shown in FIG. 3. The head region 103 shown in FIG. 3 is disclosed in the Chinese utility model specification ZL 2016 2 0911120.1. An atomization air outlet opening 114 in the front surface 110 of the head region 103 of the main body 102 is in this case situated within the wall 107 of the air distribution ring 104. Atomization air flows out of the atomization air outlet opening 114 into an inner air distribution chamber 116, which is formed by the air distribution ring 104 and the main body 102. A horn air outlet opening 112 in the front surface 110 of the head region 103 of the main body 102 lies outside the wall 107 of the air distribution ring 104. Horn air flows out of the horn air outlet opening 112 into an outer air distribution chamber 118 of the air distribution ring 104.

On a surface within the wall 107, the air distribution ring 104 has, distributed over its circumference, multiple passages 120 through which the atomization air flows out of the inner air distribution chamber 116. From the passages 120, the atomization air flows to a plate 124 which is arranged on the paint nozzle 122 as a single piece and which bears sealingly against a wall 109 of the air distribution ring 104, wherein the wall 109 is arranged on that side of the air distribution ring 104 which is averted from the front surface 110 of the head region 103 of the main body 102. The plate 124 has, distributed over its circumference, a multiplicity of passage bores 126. The air that has flowed through the passage bores 126 subsequently flows through a ring-shaped gap 130 between the central opening of the air cap 132 and the front end of the paint nozzle 122, which may be designed in the form of a spigot.

The outer air distribution chamber 118 of the air distribution ring 104 forms, together with an outer wall 134 on the head region 103 of the main body 102, a gap through which the horn air flows out of the outer air distribution chamber 118. From there, the air flows into the horn air feed channels in the air cap 132 and subsequently into the horn air bores 136, out of the openings of which the air emerges.

FIG. 4 shows an exploded view of an exemplary embodiment of a spray gun 1 according to the disclosure, or of an exemplary embodiment of a main body 2 according to the disclosure with attachment parts. The spray gun 1 may have a cup 3 for receiving and dispensing the material for spraying, wherein the cup comprises a cover 3b with a valve plug 3a, a cup body 3c and a strainer insert 3d. The spray gun 1 may furthermore comprise a material flow rate regulating device 11, an air micrometer 13, a fan control 19, a trigger system 7 composed of trigger and fastening means, and an air attachment, which may be designed as a standard attachment 4a or as a rotary joint attachment 4b. On the head region 6 of the main body 2, there can be arranged a nozzle arrangement composed of a nozzle 24, which may comprise a material nozzle 40. The nozzle arrangement may furthermore comprise an air cap 76, which can be fastened, in particular screwed, to the head region 6 by means of an air nozzle ring 74. The head region 6, the nozzle 24 and the air cap 76 with air nozzle ring 74 are, in the present case, arranged or arrangeable coaxially along an axis Z, which in the present case constitutes the above-stated central or longitudinal axis of the head region 6 of the main body 2, the central or longitudinal axis of the material nozzle 40, the central or longitudinal axis of the upper part of the main body 2, and the central or longitudinal axis of a receiving opening for receiving the material flow rate regulating device 11.

Figure 5:
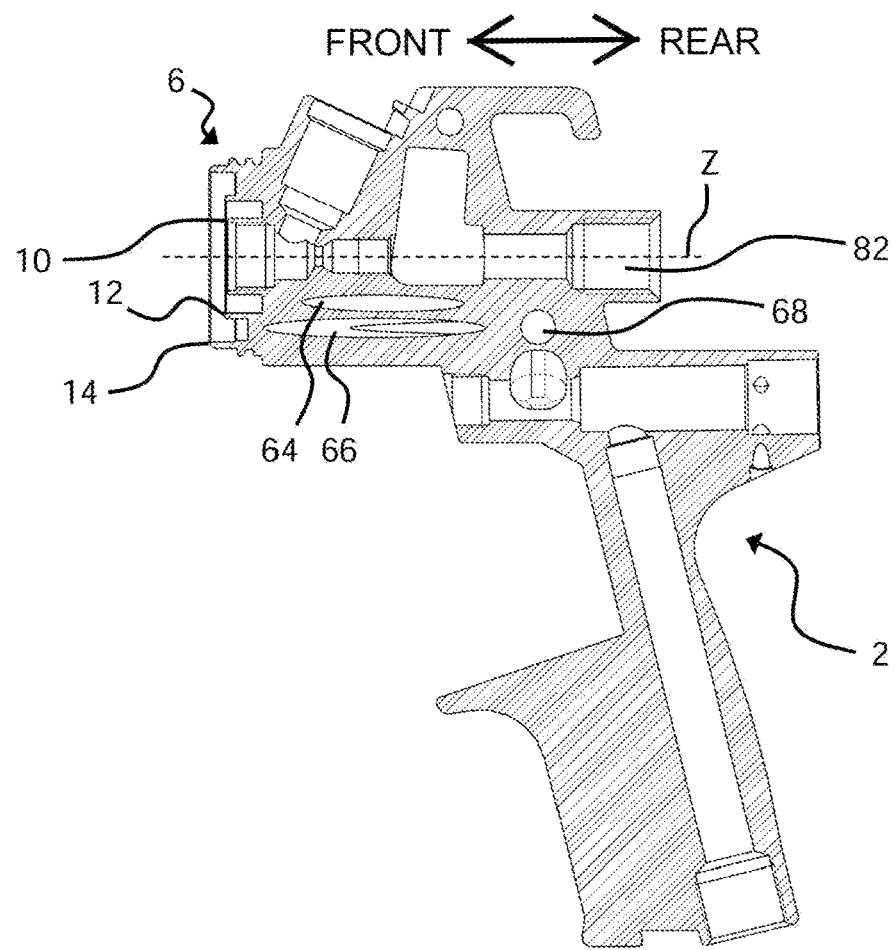
FIG. 5 shows a sectional view of an exemplary embodiment of a main body according to the disclosure for a spray gun.

FIG. 5 illustrates a sectional view of the exemplary embodiment of a main body 2 according to the disclosure for a spray gun from FIG. 4, wherein the section has been taken from top to bottom through the axis Z from FIG. 4. The main body 2 has a multiplicity of bores; in the upper part of the main body 2, in particular a multiplicity of bores along an axis Z, which in the present case constitutes the above-stated central or longitudinal axis of the head region 6 of the main body 2. In the present exemplary embodiment, said axis is identical to the central or longitudinal axis of the material nozzle 40, which can be arranged in or on the main body 2, from FIG. 4, and identical to the central or longitudinal axis of the upper part of the main body 2 and identical to the central or longitudinal axis of a receiving opening 82 for receiving a material flow rate regulating device 11, which is shown by way of example in FIG. 4.

Where it is described above that the front end of a wall is set back in relation to the front end of another wall along an axis, "along an axis" means the axis Z. As can be seen in FIG. 5, the middle wall 12 is clearly set back in relation to the outer wall 14. Here, "front" is to be regarded as the spraying direction or that side of the main body 2 on which the material nozzle 40 from FIG. 4 can be arranged, and "rear" is to be regarded as the opposite side or opposite direction, in this case the side with the receiving opening 82. The statement that the front end of the middle wall 12 is "set back" in relation to the front end of the outer wall 14 along an axis Z means that the front end of the outer wall 14 is further forward than the front end of the middle wall 12.

In the present exemplary embodiment, the inner wall 10 is set back only slightly in relation to the middle wall 12.

In FIG. 5, only a single atomization air channel 64 and one horn air channel 66, which intersects a second horn air channel, can be seen. The sectional view furthermore shows a part of a fan control air distribution chamber 68.

Figure 6:
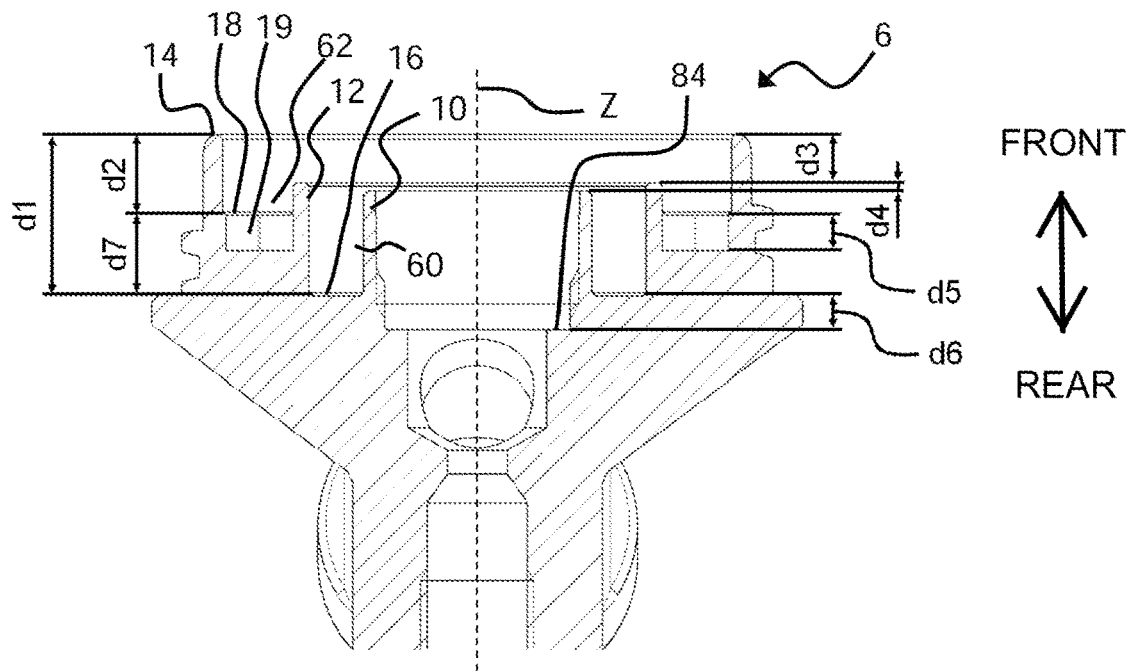
FIG. 6 shows a sectional view of the head region of an exemplary embodiment of a main body according to the disclosure for a spray gun.

FIG. 6 shows a sectional view of a part of the exemplary embodiment of a main body 2 according to the disclosure for a spray gun 1, which is shown in another sectional view in FIG. 5. The section shown in FIG. 6 has again been taken through the axis Z from FIG. 4, but along a section plane which is perpendicular to the section plane used in FIG. 5. In the present FIG. 6, it can be seen that the inner wall 10 of the head region 6 of the main body 2 of the spray gun 1 is set back by a spacing d4 in relation to the middle wall 12 along the axis Z. The middle wall 12 is in turn set back by a spacing d3 in relation to the outer wall 14 along the axis Z. In other words, the outer wall 14 projects beyond the middle wall 12, which in turn projects beyond the inner wall 10. The inner wall 10 and the outer wall 12 delimit a first air distribution chamber 60, and the middle wall 12 and the outer wall 14 delimit a second air distribution chamber 62. Towards the front, that is to say in the spraying direction, the air distribution chambers 60 and 62 are open, whereas, towards the rear, they are at least regionally delimited by a first front surface 16 and a second front surface 18 respectively. In the present exemplary embodiment, a groove 19 is formed into the second front surface 18, the base surface of which groove regionally delimits the air distribution chamber 62 to the rear instead of the second front surface 18. The air distribution chamber 62 is thus delimited towards the rear regionally by the second front surface 18 and regionally by the base surface of the groove 19. The spacing d5, that is to say the depth of the groove 19, that is to say the spacing between the second front surface 18 and the base surface of the groove 19 may for example amount to approximately 1.5 mm to 3.0 mm. The spacing d1 between the first front surface 16 and the front end of the outer wall 14 preferably amounts to between 8 mm and 12 mm, particularly preferably between 9 mm and 11 mm. The spacing d2 between the second front surface 18 and the front end of the outer wall 14 preferably amounts to between 4 mm and 6 mm. The middle wall 12 is in the present case set back by a spacing d3, which preferably amounts to approximately 2 mm to 4 mm, in relation to the outer wall 14 along the axis Z. The inner wall 10 is preferably set back only by 0.1 mm to 1.0 mm in relation to the middle wall 12. This is the spacing d4. The exemplary embodiment of a head region 6 of a main body according to the disclosure shown in FIG. 6 has a counterpart sealing surface 84 for a nozzle seal which is not shown in FIG. 6. The spacing d6 of said counterpart sealing surface 84 to the first front surface 16 preferably amounts to approximately 1.5 mm to 3.0 mm. The first front surface 16 is set back in relation to the second front surface 18 along the axis Z. In the present exemplary embodiment, the spacing d7 by which the front surface 16 is set back in relation to the second front surface 18 amounts to approximately 4 mm to 6 mm. The stated dimensions or dimension combinations have, in spraying tests, proven to be advantageous for good atomization quality.

Figure 7:
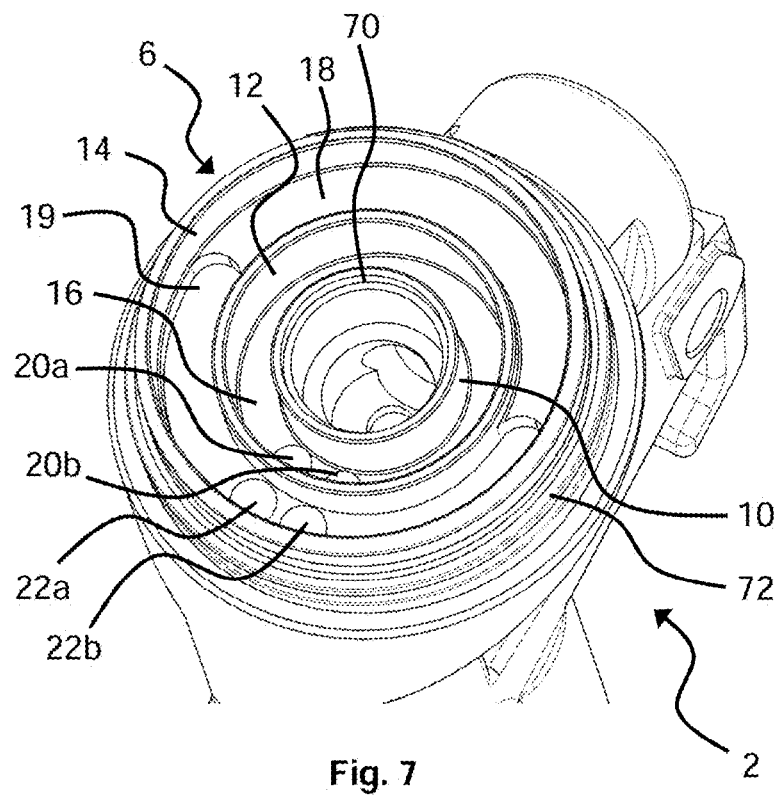
FIG. 7 shows a perspective view of the head region of an exemplary embodiment of a main body according to the disclosure for a spray gun.

FIG. 7 shows a perspective view of a part of the exemplary embodiment of a main body 2 according to the disclosure from FIG. 5 and FIG. 6. In particular, the groove 19 in the second front surface 18 can be clearly seen here. The width of the groove 19 has approximately the same width as the second front surface 18. The width of the groove 19 or of the second front surface 18 is in this case to be understood in each case to mean the extent in a radial direction of the head region 6 of the main body 2, or else the spacing between the middle wall 12 and outer wall 14 in a radial direction. In a circumferential direction, the groove 19 extends over approximately 50% of the circumference of the second front surface 18, that is to say in the present case over approximately 180°. In the present exemplary embodiment, the inner wall 10, the middle wall 12 and the outer wall 14 are in each case of circular design and arranged concentrically with respect to one another and coaxially with respect to the axis Z from the previous drawings. The axis Z runs through the axis of rotation of the walls, and the walls run parallel to the axis Z.

In the present case, the inner wall 10 has an internal thread 70 into which a nozzle not shown in FIG. 7, in particular a material nozzle, which is commonly also referred to as paint nozzle, can be screwed. In the present case, the outer wall 14 has an external thread 72, by means of which an air nozzle ring which is not shown in FIG. 7 and which has an air cap can be screwed onto the head region 6 of the main body 2. In the present case, the middle wall 12 has no thread. It is however conceivable that the middle wall 12 may also have an internal or external thread. It is furthermore conceivable for the outer wall 14 to have an internal thread for the screwing-in of a component, in particular of an air cap, and for the inner wall 10 to have an external thread for the screwing-on of a component, in particular of a nozzle.

In the present case, the first front surface 16 has two inner air outlet openings 20a and 20b, and in the present case, the second front surface 18 has two outer air outlet openings 22a and 22b. The diameter of the air outlet openings 20a, 20b, 22a and 22b corresponds approximately to the width of the front surfaces 16, 18 or of the groove 19 into which they are formed. The available space can thus be utilized for a maximum throughput of air.

Figure 8:
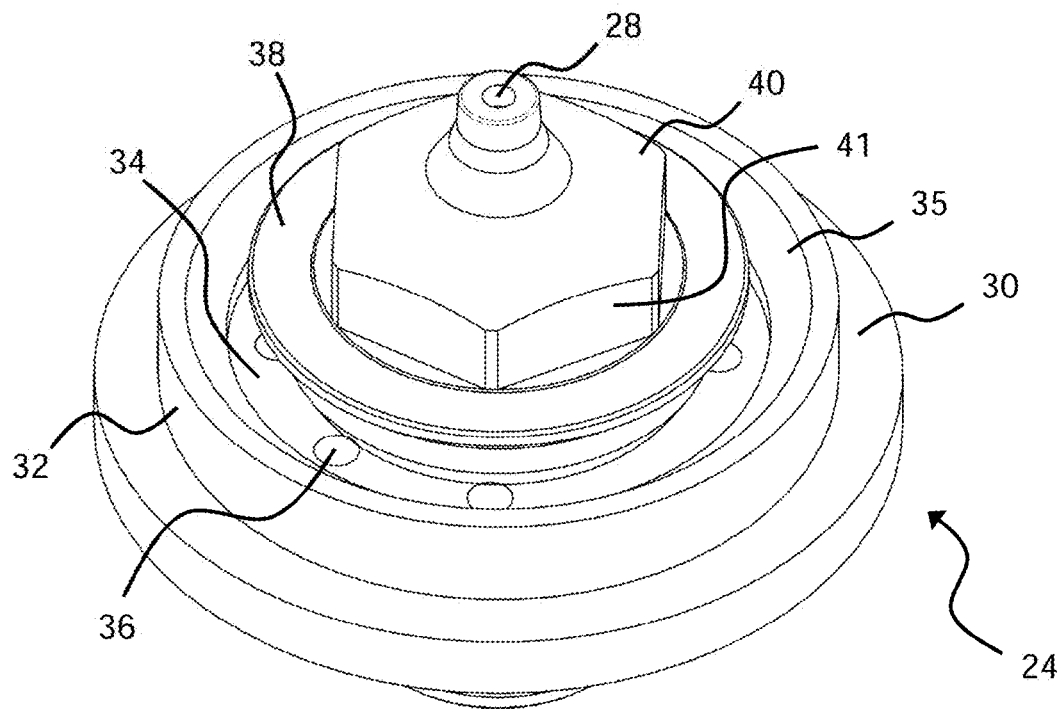
FIG. 8 shows a perspective view of an exemplary embodiment of a nozzle for use in an exemplary embodiment of a spray gun according to the disclosure or with an exemplary embodiment of a main body according to the disclosure for a spray gun.
Figure 9:
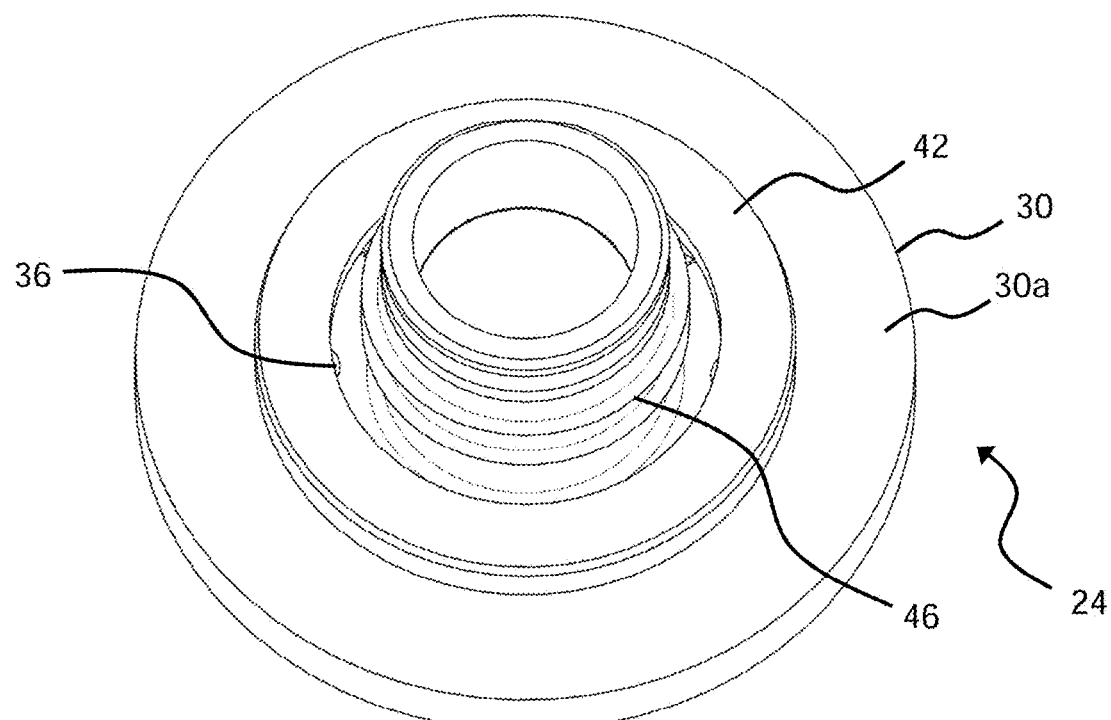
FIG. 9 shows a perspective view of the exemplary embodiment of a nozzle from FIG. 8 from another side.
Figure 10:
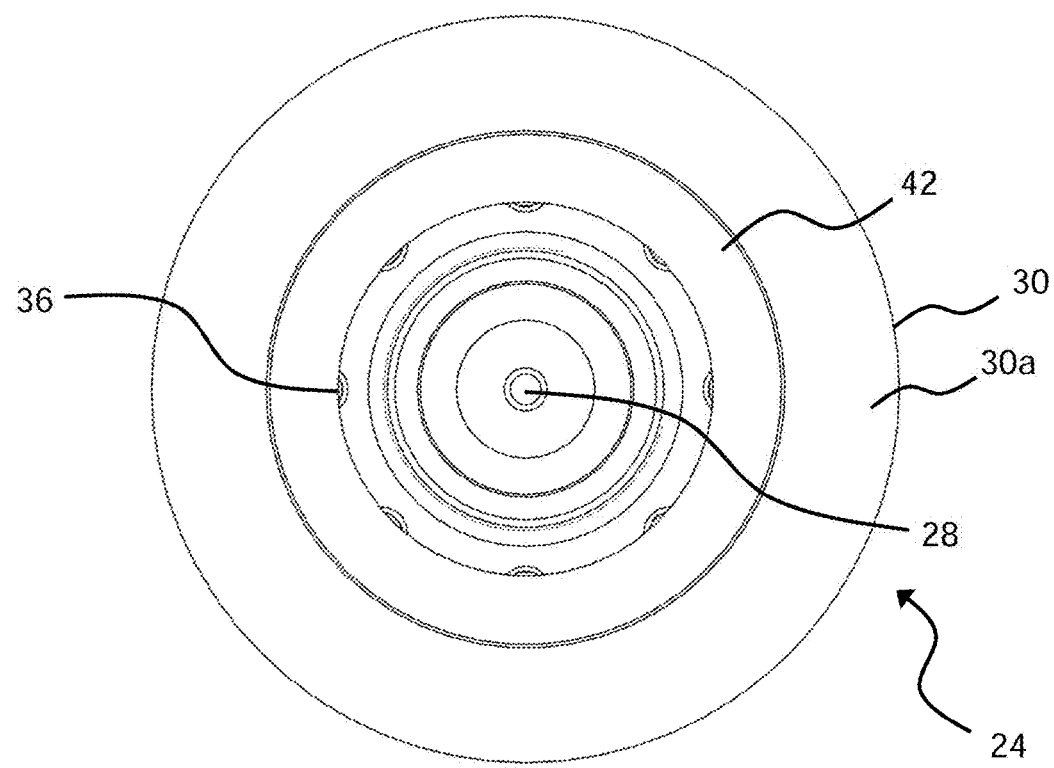
FIG. 10 shows a view from the rear of the exemplary embodiment of a nozzle from FIG. 8.

FIG. 8 shows a perspective view of an exemplary embodiment of a nozzle 24 for use in an exemplary embodiment of a spray gun according to the disclosure or with an exemplary embodiment of a main body according to the disclosure for a spray gun or else for use in a method according to the disclosure. The nozzle 24 may have at least one material nozzle 40 with a material outlet opening 28 and with a portion for the engagement of a tool, in the present case an external hexagonal profile 41, and a disc element 32 with a front surface 34 and with a conical surface 35. In the present case, the front surface 34 has multiple, preferably 7 to 9, passage openings 36 distributed over the circumference. Material nozzle 40 and disc element 32 are preferably formed as a single piece. Arranged thereon, preferably captively arranged thereon, particularly preferably pressed thereon, is a first impingement disc 30. Arranged on this in turn, preferably arranged on this as a single piece, is a second impingement disc 42, which can be seen in FIG. 9. Said second impingement disc is arranged on that side of the first impingement disc 30 which is averted from the material outlet opening 28. Like the first impingement disc 30, the second impingement disc 42 is also of ring-shaped design with an inner and an outer circumference. In a radial direction, the inner circumference of the second impingement disc 42 does not extend to the external thread 46 of the material nozzle 40, such that a gap exists between the inner circumference of the second impingement disc 42 and the external thread 46 of the material nozzle 40. Along an axis, that is to say along the central or longitudinal axis of the nozzle 24, the second impingement disc 42 is spaced apart from the passage openings 36. In a radial direction, the second impingement disc 42 almost fully overlaps the passage openings 36, as can be clearly seen in FIG. 10. Also visible in FIG. 10 are the material outlet opening 28 and the impingement surface 30a of the first impingement disc 30. It is preferable if the disc element 32 has, on its side averted from the material outlet opening 28, an incision or a groove in which the passage openings 36 are arranged. In this way, the spacing between that side of the disc element 32 which is averted from the material outlet opening 28 and that side of the second impingement disc 42 which faces toward said side increases, and the air that flows into said region has a greater volume to distribute in.

Figure 11:
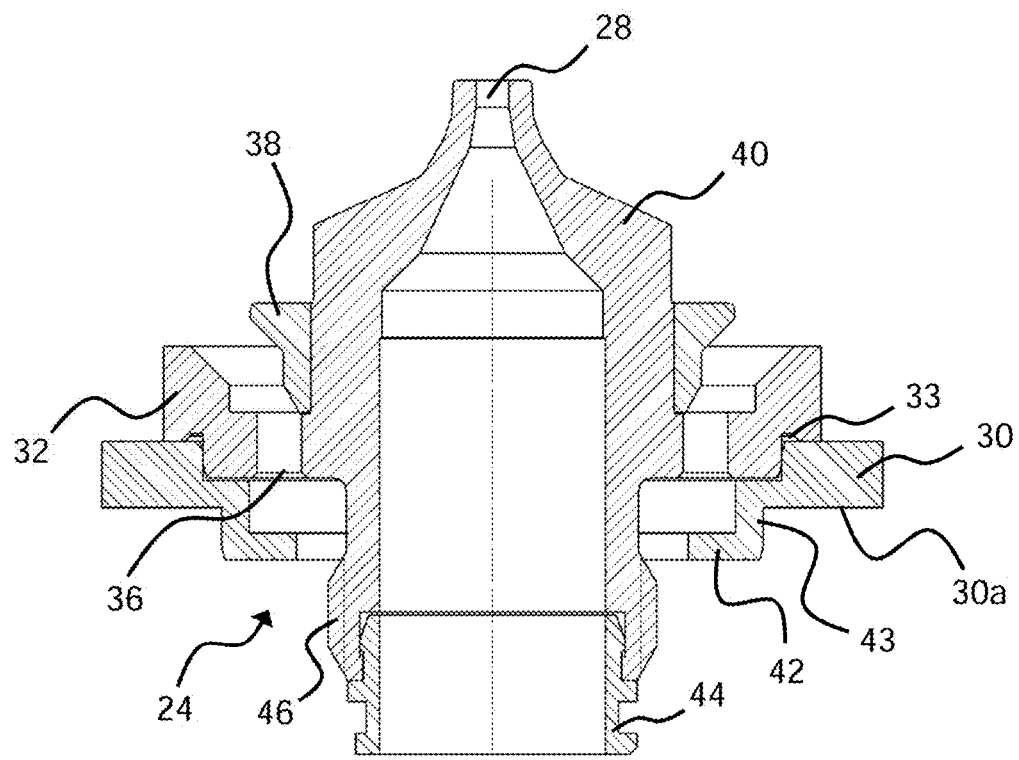
FIG. 11 shows a sectional view of the exemplary embodiment of a nozzle from FIG. 8.

FIG. 11 shows the construction of the nozzle 24 in a sectional view. It can be seen that the material nozzle 40 with its material outlet opening 28 and the disc element 32 are formed as a single piece. At its side averted from the material outlet opening 28, the disc element 32 has an encircling groove 33 which permits or facilitates the pressing of the first impingement disc 30 onto the disc element 32. The first impingement disc 30 has an inner circumference and an outer circumference, wherein the outer circumference of the first impingement disc 30 is greater than the outer circumference of the disc element 32. The inner circumference of the first impingement disc 30 extends approximately to the passage openings 36 of the disc element 32. The second impingement disc 42 is arranged as a single piece on the first impingement disc 30. A collar 43 may be arranged in between. The first impingement disc 30, the second impingement disc 42 and possibly the collar 43 form, in the present case, a Z shape. The first impingement disc 30 may have a recess on its side facing towards the material outlet opening 28, in particular in the region of the inner circumference, such that a stepped form is realized which can form the contact region between the first impingement disc 30 and disc element 32. In the present case, the disc element 32 likewise has a step on its side averted from the material outlet opening 28, in particular in the region of the outer circumference, which step forms the contact region between the first impingement disc 30 and disc element 32.

In the present case, the material nozzle 40 is equipped with an air guide disc 38, which may likewise be captively connected to, in particular pressed onto, the material nozzle 40. Furthermore, the present nozzle 24 has a nozzle seal 44, the purpose of which will be discussed further below. The nozzle seal 44 is preferably composed of plastic and is preferably exchangeably connected to the material nozzle 40. The external thread 46 of the material nozzle 40 is also indicated in FIG. 11.

Figure 12:
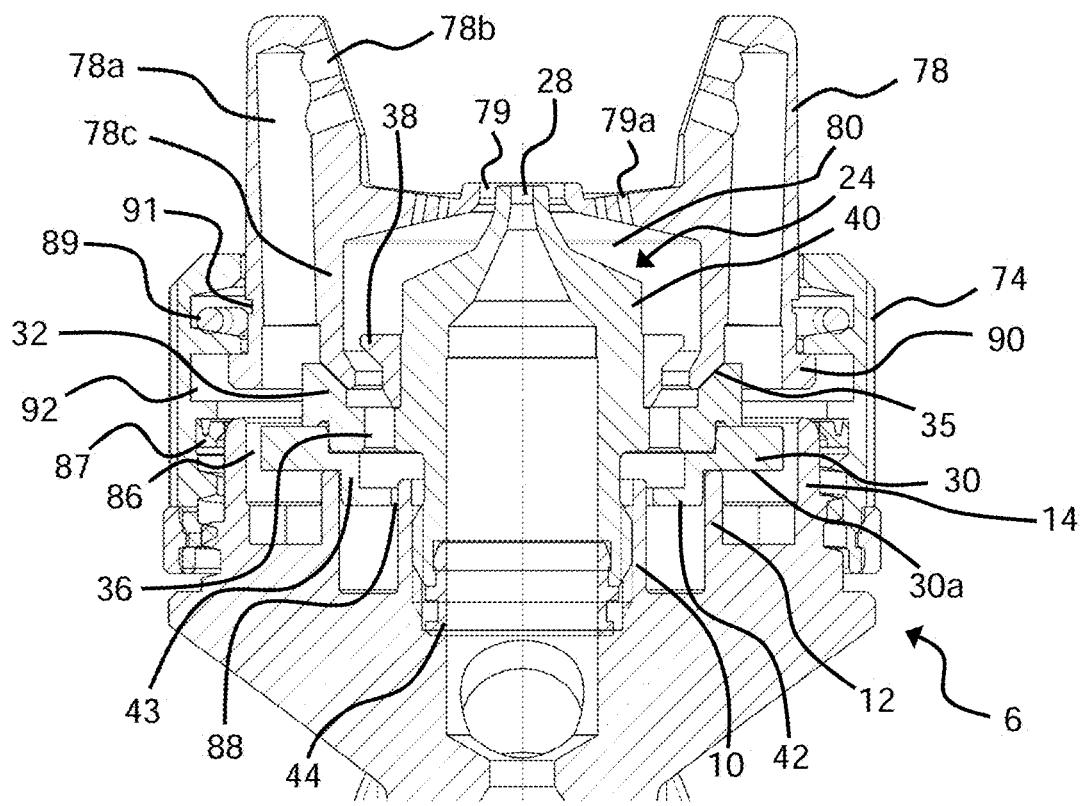
FIG. 12 shows a sectional view of the head region of an exemplary embodiment of a spray gun according to the disclosure or of an exemplary embodiment of a main body according to the disclosure with the exemplary embodiment of a nozzle from FIG. 8.

FIG. 12 shows a sectional view of the head region 6 of an exemplary embodiment of a spray gun according to the disclosure or of an exemplary embodiment of a main body according to the disclosure with the exemplary embodiment of a nozzle 24 from FIG. 8 to FIG. 11 in the assembled state. The nozzle 24, which in the present case is provided as a unit composed of material nozzle 40 with disc element 32, first impingement disc 30, second impingement disc 42, air guide disc 38 and nozzle seal 44, is screwed by means of the thread described above into the main body or into the head region thereof. Here, the stop is formed by the first impingement disc 30, in particular the impingement surface 30*a* thereof, and the middle wall 12 of the head region 6 of the main body. The impingement surface 30*a* of the first impingement disc 30 acts in this case as sealing surface, and the middle wall 12, in particular the front end of the middle wall 12, acts as counterpart sealing surface, against which the impingement surface 30*a* sealingly bears. Alternatively or in addition, it is also possible for the outer surface of the second impingement disc 42 or the outer surface of the collar 43 between first impingement disc 30 and second impingement disc 42 to bear sealingly against an inner surface of the middle wall 12.

When nozzle 24 has been screwed in, the nozzle seal 44 is pressed against a counterpart sealing surface 84, which is shown in FIG. 6, and seals off the material-guiding region of the spray gun, in particular the transition region between paint channel in the main body and hollow portion of the material nozzle 40 for guiding through the material for spraying, with respect to the air-guiding region of the spray gun.

In the installed state, the first impingement disc 30 forms, with the outer wall 14, a gap 86 which preferably constitutes a ring-shaped gap with a substantially constant width. The second impingement disc 42 forms, with the inner wall 10, a further gap 88, which likewise preferably constitutes a ring-shaped gap with a substantially constant width.

By means of the abovementioned thread, the air nozzle ring 74 can be arranged on the head region 6 of the main body. The air cap 78 is arranged in the air nozzle ring 74, wherein the air cap 78 is fixed in a first direction by means of a flange 90 which bears against a projection on the inner surface of the air nozzle ring 74. In the opposite direction, the air cap 78 is delimited by means of a securing ring 89, which lies in a groove 91 in the air cap 78 and in a recess in the inner surface of the air nozzle ring 74. Merely in order to be more clearly identified, the securing ring 89 is, in the present FIG. 12, illustrated outside the groove 91, wherein it is also not necessary for the securing ring 89 to be situated entirely in the groove 91. For example, the securing ring 89 may be of polygonal design, such that it lies only regionally in the circular groove 91.

As can be seen in FIG. 7, in the present exemplary embodiment of the main body according to the disclosure, the first front surface 16 between inner wall 10 and middle wall 12 and the second front surface 18 between middle wall 12 and outer wall 14 have in each case two air outlet openings 20*a* and 20*b* or 22*a* and 22*b* respectively. Referring again to FIG. 12, it can be seen that the air flowing out of the two inner air outlet openings 20*a* and 20*b* between inner wall 10 and middle wall 12 firstly impinges on the second impingement disc 42. Owing to the constriction in the form of the gap 88, the air distributes over the circumference of the air distribution chamber between inner wall 10 and middle wall 12. The air flows through the gap 88 and is thereby throttled before it flows through the passage openings 36 of the disc element 32. The air, which in a certain way emerges in "punctiform" fashion from the passage openings 36, impinges on the air guide element 38, whereby the air is distributed more areally, is homogenized and is throttled again slightly owing to the slight constriction between air guide element 38 and inner surface of the air cap 78. From the air cap chamber 80 between air cap 78 and material nozzle 40, the air then flows through a gap, in particular a ring-shaped gap, which forms as a result of the front end of the material nozzle 40 projecting from the inside into the central opening 79 in the air cap 78. The material for spraying which flows from a material feed device through the paint channel in the main body of the spray gun and the hollow portion of the material nozzle 40 is atomized by the air flowing out of the gap, whereby the so-called spray jet is formed. The air with the profile described immediately above is thus referred to as atomization air. The two inner air outlet openings 20*a* and 20*b* between inner wall 10 and middle wall 12 may be referred to as atomization air outlet openings, the air channels situated therebehind may be referred to as atomization air channels, and the air distribution chamber which is delimited by the inner wall 10 and the middle wall 12 may be referred to as atomization air distribution chamber. The region flowed through by the atomization air may be referred to as atomization air region.

The air flowing out of the two outer air outlet openings 22*a* and 22*b*, which are duly present in the exemplary embodiment of the main body according to the disclosure shown in FIG. 12 but can be seen particularly clearly in FIG. 7, firstly impinges on the first impingement disc 30. Owing to the constriction in the form of the gap 86, the air distributes over the circumference of the air distribution chamber between middle wall 12 and outer wall 14. The air flows through the gap 86 and is thereby throttled. The air advantageously subsequently flows into an intermediate chamber 92 and into the horn air feed channels 78*a* in the horns of the air cap 78. From here, the air flows out of the horn air bores 78*b* and impinges on the abovementioned spray jet and deforms the latter. In particular, the so-called horn air flowing out of the horn air bores 78*b* in the diametrically oppositely situated horns of the air cap 78 compresses the spray jet, which originally has a circular cross section, at two opposite sides, whereby a so-called wide jet is formed. The flow rate of the horn air flowing out of the horn air bores 78*b*, or even the flow rate of the air flowing out of the outer air outlet openings 22*a* and 22*b*, which can be referred to as horn air outlet openings, can be set by means of a fan control 9 shown by way of example in FIG. 4. If the horn air is reduced to zero or approximately zero, the spray gun generates a so-called round jet with a circular cross section. The air channels behind the so-called horn air outlet openings may be referred to as horn air channels, the air distribution chamber that is delimited by the middle wall 12 and the outer wall 14 is referred to as horn air distribution chamber, and the region flowed through by the horn air is referred to as horn air region. For the sealing of the horn air region with respect to the surroundings, a sealing element 87 may be provided between air nozzle ring 74 and head region 6.

So-called control openings 79*a* may be formed into the front surface of the air cap 78, radially outside the central opening 79. The air emerging from the control openings 79*a* influences the horn air, in particular weakens the impingement of the horn air on the spray jet. Furthermore, the so-called control air protects the air cap 78 against contamination, by carrying paint droplets away from the air cap 78. It furthermore contributes to the further atomization of the spray jet. The control air also acts on the round jet and causes a slight pre-deformation and, in this case, too, additional atomization.

As can be clearly seen in FIG. 12, the separation, in particular the sealing, between atomization air region and horn air region is realized by means of the middle wall 12, the first impingement disc 30, the disc element 32 and by means of the air cap 78, in particular by means of a preferably encircling web 78c of the air cap 78. In the present case, the web 78c has a conical region which bears against the conical surface 35 of the disc element 32. Centring of the air cap 78 is also realized in this way, whereby it is ensured that the air cap 78 and the material nozzle 40 are arranged concentrically with respect to one another, and the above-stated gap, in particular the ring-shaped gap, between the front end of the material nozzle 40 and the air cap 78 for the outlet of the atomization air has a constant width.

It is clear that, owing to the particular design of the main body according to the disclosure and of the spray gun according to the disclosure, no additional sealing element is required for sealing between the atomization air region and horn air region. Owing to the front end of the middle wall 12 being set back in relation to the front end of the outer wall 14, the middle wall 12, which is of significance for the sealing between atomization air region and horn air region, of the main body according to the disclosure is well protected against damage even when a nozzle 24 has been unscrewed. Furthermore, by means of this design, the head region 6 of the main body according to the disclosure offers space for the first impingement disc 30, which thus does not project beyond the outer wall 14. The gun head can thus be of very compact design.

The nozzle 24 shown in FIGS. 8 to 12 is preferably a low-pressure or HVLP nozzle, or a nozzle for use in a low-pressure or HVLP nozzle arrangement, in particular for use in a method according to the disclosure for converting a spray gun, in particular a paint spray gun.

Figure 13:
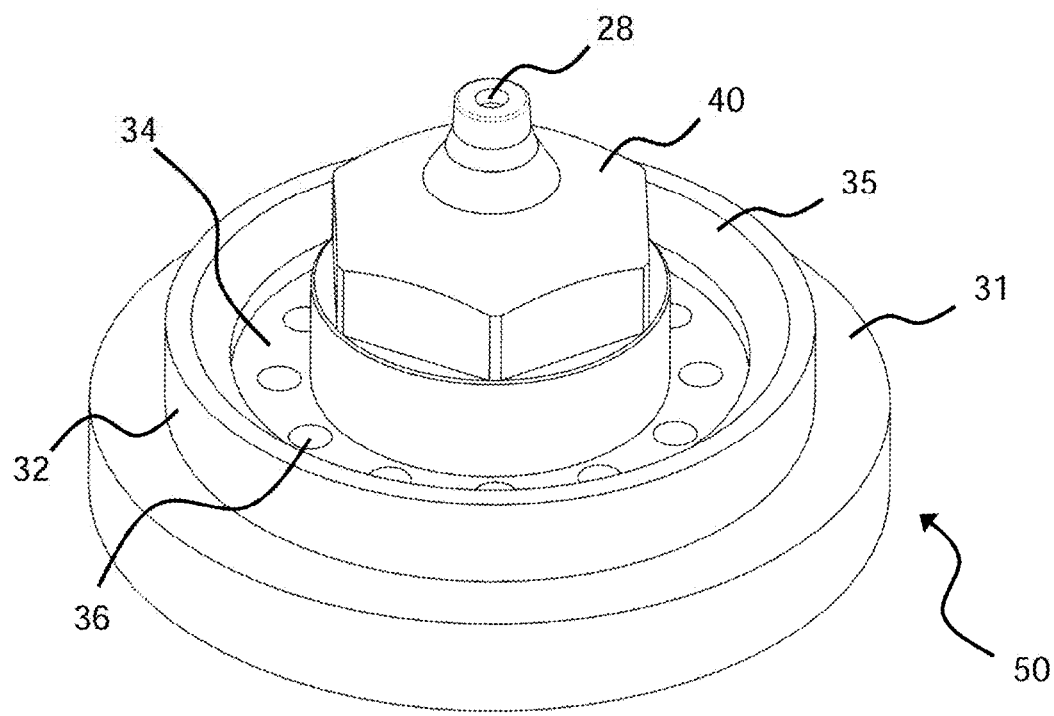
FIG. 13 shows a perspective view of a second exemplary embodiment of a nozzle for use in an exemplary embodiment of a spray gun according to the disclosure or with an exemplary embodiment of a main body according to the disclosure for a spray gun.

FIG. 13 shows a perspective view of a second exemplary embodiment of a nozzle for use in an exemplary embodiment of a spray gun according to the disclosure or with an exemplary embodiment of a main body according to the disclosure for a spray gun or else for use in a method according to the disclosure. In relation to the first exemplary embodiment shown in FIGS. 8 to 12, the present nozzle 50 has no air guide disc, and the disc element 32 has a greater number of passage openings 36 in the front surface 34. The nozzle 50 otherwise also has a material nozzle 40 with a material outlet opening 28, and the disc element 32 has a conical surface 35. The disc element 32 preferably has, on its side averted from the material outlet opening 28, an incision or a groove in which the passage openings 36 are arranged. Thus, in the installed state of the nozzle 50, the spacing between that side of the disc element 32 which is averted from the material outlet opening 28 and the first front surface 16 of the head region 6 of the main body 2 increases, and the air that flows into said region has a greater volume to distribute in.

Figure 14:
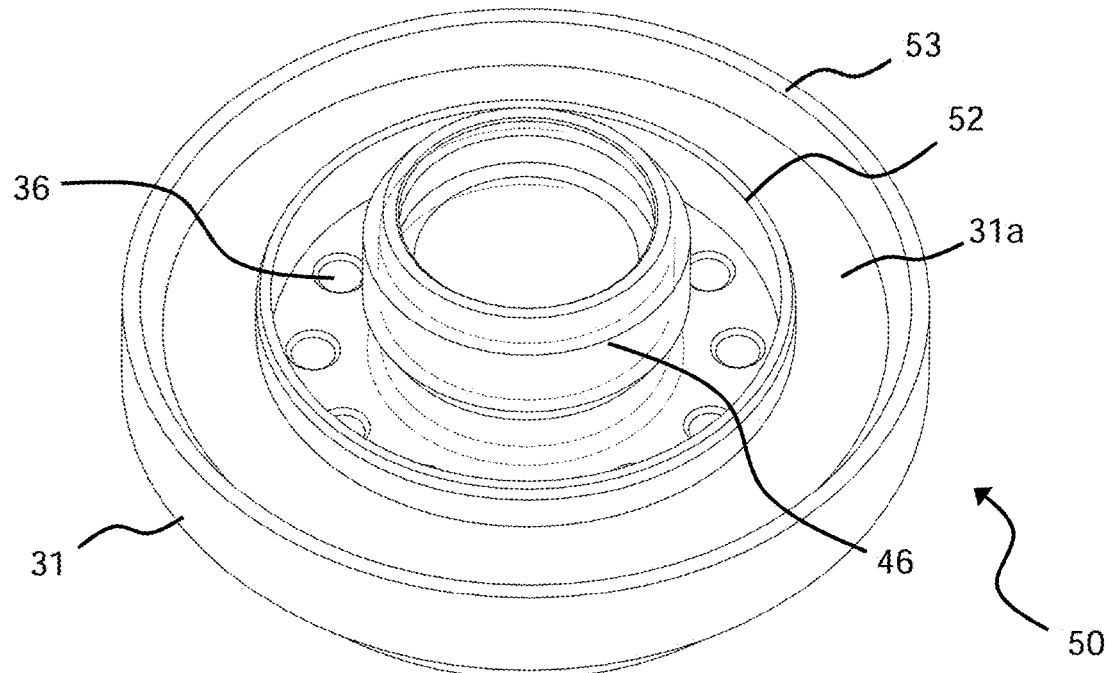
FIG. 14 shows a perspective view of the exemplary embodiment of a nozzle from FIG. 13 from another side.

It can be seen for the first time in FIG. 14 that the first impingement disc 31 of the nozzle 50 is designed differently than the first impingement disc 30 of the nozzle 24 described above. The nozzle 50 has no second impingement disc, and instead has an inner collar 52 and an outer collar 53 with an interposed impingement surface 31a.

Figure 15:
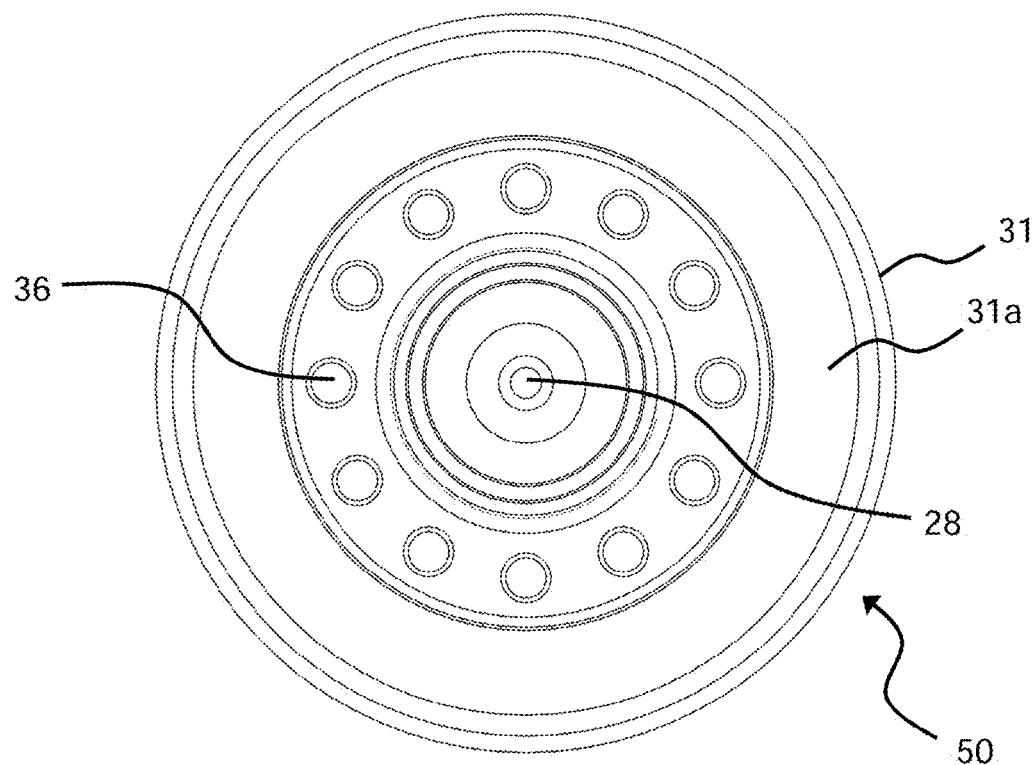
FIG. 15 shows a view from the rear of the exemplary embodiment of a nozzle from FIG. 13.

In FIG. 15, which shows a view of the nozzle 50 from the rear, it is clear that the passage openings 36 are completely exposed, that is to say are not covered or projected over by other components of the nozzle 50. The disc element 32 of the nozzle 50 preferably has a greater number of passage openings 36, in particular between 10 and 14.

Figure 16:
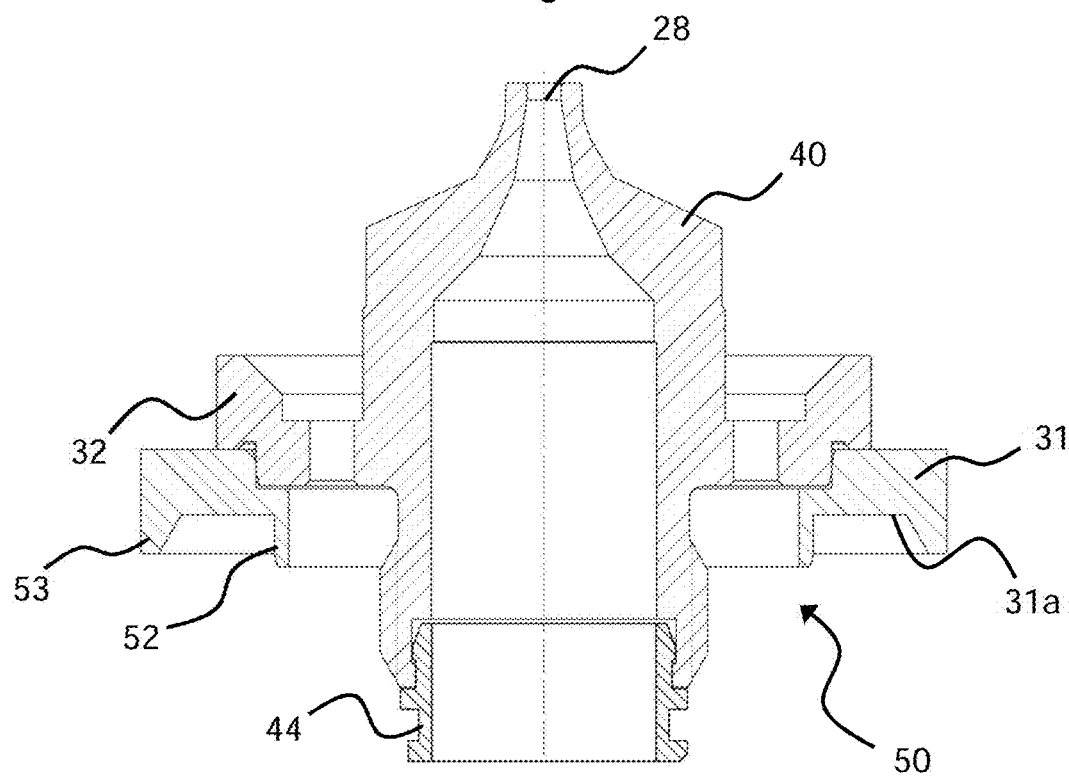
FIG. 16 shows a sectional view of the exemplary embodiment of a nozzle from FIG. 13.

The exposed passage openings 36 can also be seen in FIG. 16, which is a sectional view of the nozzle 50. The material nozzle 40 with disc element 32 arranged as a single piece and preferably exchangeably arranged nozzle seal 44 is substantially identical to the material nozzle 40 with disc element 32 arranged as a single piece and preferably exchangeably arranged nozzle seal 44 of the above-described nozzle 24. The above statements relating to these components apply correspondingly to the nozzle 50. The first impingement disc 31 with inner collar 52, outer collar 53 and interposed impingement surface 31a differs from the first impingement disc 30 of the above-described nozzle 24.

Figure 17:
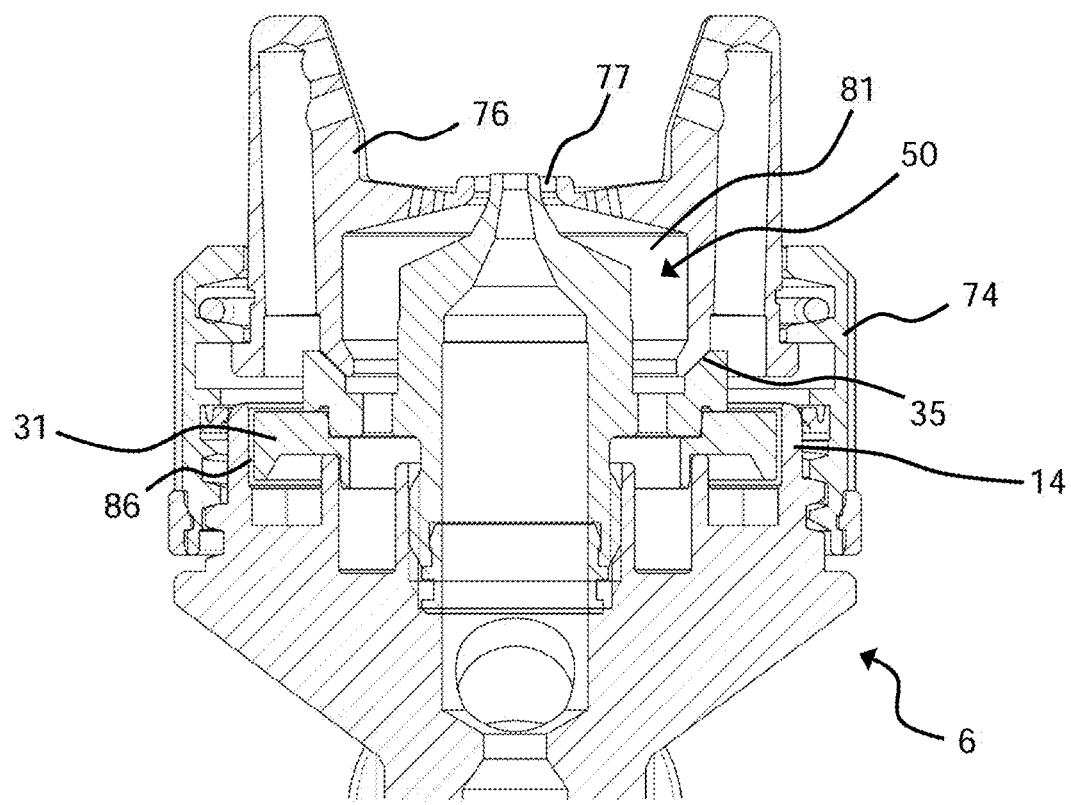
FIG. 17 shows a sectional view of the head region of an exemplary embodiment of a spray gun according to the disclosure or of an exemplary embodiment of a main body according to the disclosure with the exemplary embodiment of a nozzle from FIG. 13.

FIG. 17 shows a sectional view of the head region 6 of an exemplary embodiment of a spray gun according to the disclosure or of an exemplary embodiment of a main body according to the disclosure with the exemplary embodiment of a nozzle 50 from FIGS. 13 to 16. The main body is the exemplary embodiment shown in FIG. 12. In particular, the head region 6 is of identical design, for which reason reference can be made to the above statements relating to this. It can be seen that the gap 86 between outer wall 14 and first impingement disc 31 is narrower than the gap 86 from FIG. 12, which shows the head region 6, equipped with the above-described nozzle 24, of the main body. Since this is the same main body with the same dimensions, in particular with the same internal diameter of the outer wall 14, it is clear that the first impingement disc 31 of the nozzle 50 has a greater outer diameter than the first impingement disc 30 of the nozzle 24. The rest of the statements relating to the arrangement shown in FIG. 12 may also apply to the arrangement shown in FIG. 17.

Owing to the absent second impingement disc and absent air guide disc in the case of the nozzle 50 in relation to the nozzle 24, the atomization air is throttled less intensely in the arrangement shown in FIG. 17, that is to say in the case of the nozzle 50 being used, than in the case of the arrangement shown in FIG. 12, that is to say in the case of the nozzle 24 being used. In this way, the nozzle internal pressure, that is to say in particular the pressure in the air cap chamber 81 between air cap 78 and material nozzle 40 in the case of the nozzle 50 being used is greater than the nozzle internal pressure, that is to say in particular the pressure in the air cap chamber 80 shown in FIG. 12 between air cap 78 and material nozzle 40, in the case of the nozzle 24 being used.

The nozzle 50 shown in FIGS. 13 to 17 is preferably a high-pressure or compliant nozzle, or a nozzle for use in a high-pressure or compliant nozzle arrangement, in particular for use in a method according to the disclosure for converting a spray gun, in particular a paint spray gun, with a first nozzle internal pressure into a spray gun, in particular a paint spray gun, with a second nozzle internal pressure.

Figure 18:
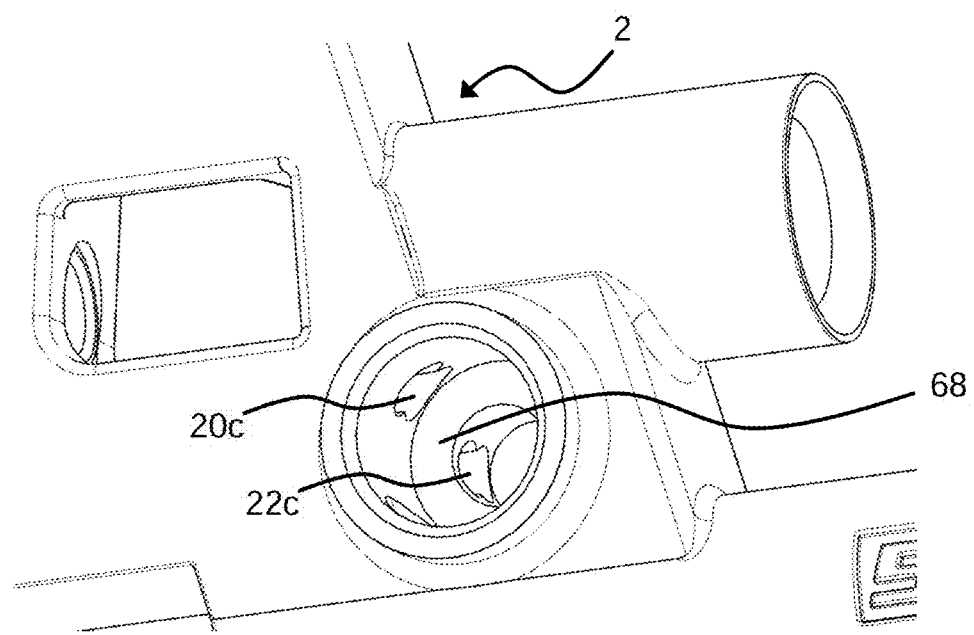
FIG. 18 shows a perspective view of a part of an exemplary embodiment of a main body according to the disclosure.

FIG. 18 shows a perspective view of a part of an exemplary embodiment of a main body according to the disclosure, specifically of the region in which a fan control 9 shown by way of example in FIG. 4 can be arranged. In particular, in FIG. 18, the interior of the fan control air distribution chamber 68 can be at least partially seen. As described above, the main body 2 according to the disclosure may, on the head region 6, have in each case two atomization air outlet openings 20a, 20b and two horn air outlet openings 22a, 22b, as can be seen in FIG. 7. In the head region 6, the two atomization air outlet openings 20a, 20b are spaced apart from one another, as are the two horn air outlet openings 22a, 22b. The atomization air channels situated behind the two atomization air outlet openings 20a, 20b, that is to say the air channels which end in the form of the atomization air outlet openings 20a, 20b, extend into the fan control air distribution chamber 68, converge along their path into the fan control air distribution chamber 68, and meet at the latest at the point of intersection with a wall of the fan control air distribution chamber 68. The fan control air distribution chamber 68 thus has only a single atomization air channel mouth 20*c*. The horn air channels situated behind the two horn air outlet openings 22*a*, 22*b*, that is to say the air channels which end in the form of the horn air outlet openings 22*a*, 22*b*, also extend into the fan control air distribution chamber 68, converge on their path into the fan control air distribution chamber 68, and meet at the latest at the point of intersection with a wall of the fan control air distribution chamber 68. The fan control air distribution chamber 68 thus also has only a single horn air channel mouth 22*c*.

The outer contours of the atomization air channel mouth 20*c* and of the horn air channel mouth 22*c* in the fan control air distribution chamber 68 may have the outer contour of a horizontal "8". If the two atomization air channels and the two horn air channels in each case completely overlap at the inlet into the fan control air distribution chamber 68, the atomization air channel mouth 20*c* has substantially the same cross-sectional shape as at least one of the atomization air outlet openings 20*a* and 20*b*, and the horn air channel mouth 22*c* has substantially the same cross-sectional shape as one of the horn air outlet openings 22*a*, 22*b*.

Various fan controls are known from the prior art, for example from EP 0 706 832 B1 or EP 2 451 586 B1. For the present main body according to the disclosure, use may be made of any type of fan controls. It is however preferable for the fan control air distribution chamber 68 to have a first chamber portion and a second chamber portion, wherein the second chamber portion has a greater diameter than the first chamber portion. The horn air channels of the main body 2 open into the first chamber portion, that is to say the horn air channel mouth 22*c* is situated in the first chamber portion. The atomization air channels of the main body 2 open into the second chamber portion, that is to say the atomization air channel mouth 20*c* is situated in the second chamber portion. The portions form a step against which a plate of a fan control can bear in order to close the first chamber portion and thus prevent the feed of air into the horn air channel mouth 22*c* and thus into the horn air channels. In this case, during the operation of the spray gun, only the atomization air channel mouth 20*c* and thus the atomization air channels are supplied with air. The spray gun generates a round jet with a substantially circular cross section, because no horn air acts laterally on the spray jet. By means of a rotary mechanism, for example, the plate of the fan control can be moved preferably in continuously variable fashion away from the step between first and second chamber portion of the fan control air distribution chamber 68, such that the plate permits the feed of air to the first chamber portion and thus to the horn air channel mouth 22*c* and to the horn air channels in the main body 2. The further the plate is moved away from the step, the more air can flow through the horn air channels and thus out of the horn air bores, and the greater the extent to which the spray jet is laterally compressed, whereby an ever narrower wide jet is generated.

It is finally pointed out that the described exemplary embodiments describe only a limited selection of design possibilities, and thus do not constitute a limitation of the present disclosure.

The invention claimed is:

1. A main body for a spray gun comprising a head region for the attachment of a nozzle arrangement,
    wherein the head region has an inner wall, an outer wall, and a middle wall arranged in between,
    wherein the inner, outer, and middle walls are monolithically formed in encircling fashion with the main body,
    wherein a frontmost point of an outer side of a front end of the middle wall is set back by a first spacing in relation to a frontmost point of a front end of the outer wall along an axis, and
    wherein a frontmost point of a front end of the inner wall is set back by a second spacing in relation to the frontmost point of the outer side of the front end of the middle wall along the axis, the first spacing being greater than the second spacing,
    wherein a first front surface is arranged between the inner wall and the middle wall, and a second front surface is arranged between the middle wall and the outer wall,
    wherein at least one of the first front surface has a groove along the inner wall and the middle wall or the second front surface has a groove along the middle wall and the outer wall, and
    wherein each of the first front surface and the second front surface has at least one air outlet opening, and at least one of the first front surface or second front surface has at least two air outlet openings.

2. The main body according to claim 1,
    wherein the inner wall and the middle wall delimit a first air distribution chamber, and the middle wall and the outer wall delimit a second air distribution chamber, and
    wherein the first or second air distribution chamber has one portion that is delimited towards a rear of the main body by the first or second front surface, and another portion that is delimited towards the rear of the main body by a base surface of the groove in the first or second front surface.

3. The main body according to claim 1,
    wherein the first front surface, the inner wall, and the middle wall delimit a first air distribution chamber,
    wherein the second front surface, the middle wall, and the outer wall delimit a second air distribution chamber,
    wherein the first front surface has a third spacing to the frontmost point of the front end of the outer wall along the axis, and
    wherein the second front surface has a fourth spacing to the frontmost point of the front end of the outer wall along the axis, with the third spacing being greater than the fourth spacing.

4. The main body according to claim 3, wherein the third spacing is between 9 mm to 11 mm and the fourth spacing is between 4 mm to 6 mm.

5. The main body according to claim 3, wherein one of the first and second air distribution chambers has one portion that is delimited towards a rear of the main body by the first or second front surface, and another portion that is delimited towards the rear of the main body by a base surface of the groove in the first or second front surface.

6. The main body according to claim 3,
    wherein the second front surface has the groove along the middle wall and the outer wall, this groove having a base surface,
    wherein the base surface has a fifth spacing to the frontmost point of the front end of the outer wall along the axis, and
    wherein the fifth spacing is smaller than the third spacing of the first front surface to the frontmost point of the front end of the outer wall.

7. The main body according to claim 3,
wherein the main body has at least two atomization air channels which extend from the first front surface into a fan control air distribution chamber,
wherein the main body has at least two horn air channels which extend from the second front surface into the fan control air distribution chamber,
wherein the at least two atomization air channels are spaced apart from one another at the first front surface and at least partially overlap at the fan control air distribution chamber, and
wherein the at least two horn air channels are spaced apart from one another at the second front surface and at least partially overlap at the fan control air distribution chamber.

8. The main body according to claim 1, wherein the second front surface has the groove along the middle wall and the outer wall, and a width of this groove corresponds to a width of the second front surface.

9. The main body according to claim 1, wherein the second front surface has the groove along the middle wall and the outer wall, and this groove extends in a circumferential direction over 25% to 75% of a circumference of the second front surface.

10. The main body according to claim 1, wherein the at least one air outlet opening of the first front surface extends over at least 85% of a width of the first front surface.

11. The main body according to claim 1,
wherein each of the inner wall, the middle wall, and the outer wall is of circular design and the inner, middle, and outer walls are arranged concentrically with respect to one another, and
wherein each of the inner wall, the middle wall and the outer wall has a constant height.

12. The main body according to claim 1, wherein the inner wall has an internal thread and the outer wall has an external thread.

13. The main body according to claim 1, wherein the second front surface has the groove along the middle wall and the outer wall, and the at least one air outlet opening of the second front surface lies within this groove.

14. The main body according to claim 1,
wherein the inner wall and the middle wall delimit a first air distribution chamber, and the middle wall and the outer wall delimit a second air distribution chamber, and
wherein the second air distribution chamber has one portion that is delimited towards a rear of the main body by the second front surface, and another portion that is delimited towards the rear of the main body by a base surface of the groove along the middle wall and the outer wall.

15. The main body according to claim 1,
wherein the first front surface is at a constant distance from the frontmost point of the front end of the inner wall along the axis, and
wherein the second front surface is at a constant distance from the frontmost point of the front end of the outer wall along the axis.

16. The main body according to claim 1,
wherein the inner wall and the middle wall delimit a first air distribution chamber, and the middle wall and the outer wall delimit a second air distribution chamber,
wherein the first air distribution chamber has a constant depth from the frontmost point of the front end of the inner wall, and
wherein the second air distribution chamber has a constant depth from the frontmost point of the front end of the outer wall.

17. The main body according to claim 1,
wherein the inner wall and the middle wall delimit a first air distribution chamber, and the middle wall and the outer wall delimit a second air distribution chamber,
wherein the first air distribution chamber is at a first depth from the frontmost point of the outer side of the front end of the middle wall, and
wherein the second air distribution chamber is at a second depth from the frontmost point of the outer side of the front end of the middle wall, the first depth being greater than the second depth.

18. A spray gun comprising the main body according to claim 1.

19. The spray gun according to claim 18, further comprising:
a nozzle having at least one material nozzle,
an air cap,
a first air-guiding region, and
a second air-guiding region,
wherein the first air-guiding region guides air for atomizing material for spraying, and the second air-guiding region guides air for influencing a spray jet,
wherein the first air-guiding region and the second air-guiding region are at least regionally separated from one another by the middle wall of the main body, a disc element arranged integrally on the at least one material nozzle, at least one impingement disc arranged on the at least one material nozzle, and by at least one part of the air cap, and
wherein the middle wall of the main body is of encircling design.

20. The spray gun according to claim 19, wherein the at least one impingement disc has at least one sealing surface which bears sealingly against a counterpart sealing surface on the middle wall of the main body.

21. The spray gun according to claim 19, wherein the at least one impingement disc is formed from a first portion and a second portion which together form a step, and wherein an outer diameter of the step substantially corresponds to the inner diameter of the middle wall of the main body.

22. The spray gun according to claim 18, further comprising:
a nozzle with at least one material nozzle with a hollow portion for guiding through material for spraying and with a material outlet opening, and
a disc element arranged on an outer circumference of the hollow portion,
wherein at least one impingement disc is arranged on a side of the disc element averted from the material outlet opening,
wherein the at least one impingement disc has an inner and an outer circumference, and
wherein the nozzle is arranged in or on the main body such that a first gap is formed between the outer wall and the at least one impingement disc.

23. The spray gun according to claim 22, wherein the nozzle is arranged in or on the main body such that a second gap is formed between the inner wall and the at least one impingement disc.

24. A spray gun set comprising the main body according to claim 1, a first nozzle arrangement with a first nozzle and a second nozzle arrangement with a second nozzle, wherein the first nozzle arrangement is a low-pressure nozzle arrangement and the second nozzle arrangement is a high-pressure nozzle arrangement.

25. A main body for a spray gun comprising a head region for the attachment of a nozzle arrangement,
   wherein the head region has an inner wall, an outer wall, and a middle wall arranged in between,
   wherein the inner, outer, and middle walls are monolithically formed in encircling fashion with the main body,
   wherein a frontmost point of an outer side of a front end of the middle wall is set back by a first spacing in relation to a frontmost point of a front end of the outer wall along a longitudinal axis of the head region,
   wherein a first front surface is arranged between the inner wall and the middle wall, and a second front surface is arranged between the middle wall and the outer wall,
   wherein at least one of the first front surface has a groove along the inner wall and the middle wall or the second front surface has a groove along the middle wall and the outer wall,
   wherein a first air distribution chamber has one portion that is delimited towards a rear of the main body by the first or second front surface, and another portion that is delimited towards the rear of the main body by a base surface of the groove in the first or second front surface, and
   wherein each of the first front surface and the second front surface has at least one air outlet opening, and at least one of the first front surface or second front surface has at least two air outlet openings.

26. The main body according to claim 25,
   wherein the first air distribution chamber is delimited by the middle wall and one of the inner wall and the outer wall,
   wherein a second air distribution chamber is delimited by the middle wall and the other of the inner wall and the outer wall, and
   wherein the first and second air distribution chambers are open towards a front of the main body.

27. The main body according to claim 25, wherein the second front surface has the groove along the middle wall and the outer wall, and the at least one air outlet opening of the second front surface lies within this groove.

28. The main body according to claim 27, wherein the at least one air outlet opening of the second front surface lies within the portion of the first air distribution chamber that is delimited towards the rear of the main body by the base surface of the groove along the middle wall and the outer wall.

29. The main body according to claim 25, wherein a frontmost point of a front end of the inner wall is set back by a second spacing in relation to the frontmost point of the outer side of the front end of the middle wall along the longitudinal axis of the head region, the first spacing being greater than the second spacing.

* * * * *